US006572124B2

(12) United States Patent
Mlsna et al.

(10) Patent No.: US 6,572,124 B2
(45) Date of Patent: Jun. 3, 2003

(54) LIFT AXLE CONTROL SYSTEM

(75) Inventors: Alexander M. Mlsna, Indianapolis, IN (US); Paul D. Mundie, Indianapolis, IN (US); Robert L. Thommen, Indianapolis, IN (US)

(73) Assignee: SMC Corporation of America, Indianapolis, IN (US)

( * ) Notice: Subject to any disclaimer, the term of this patent is extended or adjusted under 35 U.S.C. 154(b) by 63 days.

(21) Appl. No.: 09/795,162

(22) Filed: Feb. 28, 2001

(65) Prior Publication Data

US 2002/0117823 A1 Aug. 29, 2002

(51) Int. Cl.[7] .............................................. B62D 61/12
(52) U.S. Cl. ............................. 280/86.5; 280/124.16; 180/24.02
(58) Field of Search ....................... 280/5.501, 86.5, 280/124.157, 124.16; 180/24.02, 209

(56) References Cited

U.S. PATENT DOCUMENTS

| 4,195,856 A | * | 4/1980 | Larson et al. ............... 280/86.5 |
| 4,854,409 A | | 8/1989 | Hillenbrand et al. |
| 4,903,973 A | | 2/1990 | Bray |
| 4,944,526 A | | 7/1990 | Eberling |
| 5,018,755 A | * | 5/1991 | McNeilus et al. ......... 280/86.5 |
| 5,230,528 A | | 7/1993 | Van Raden et al. |
| 5,505,481 A | | 4/1996 | VanDenberg et al. |
| 5,549,322 A | | 8/1996 | Hauri |
| 5,778,798 A | | 7/1998 | VanDenberg |
| 6,007,078 A | * | 12/1999 | Gottschalk et al. ......... 280/86.5 |
| 6,062,578 A | | 5/2000 | Richardson |
| 6,073,946 A | | 6/2000 | Richardson |

FOREIGN PATENT DOCUMENTS

| GB | 2 288 771 | * | 11/1995 |
| WO | 94/07737 | * | 4/1994 |

OTHER PUBLICATIONS

"Axle Lift Modules, MEAD, The Spirit of Automation, Engineered Pneumatic Solutions," MEAD; Chicago, IL; date unknown.

* cited by examiner

Primary Examiner—Peter C. English
(74) Attorney, Agent, or Firm—Bose McKinney & Evans LLP

(57) ABSTRACT

A lift axle control system is provided for a vehicle that has fixed axles and a lift axle. The lift axle is configured to move between a raised position spaced apart from the ground and a lowered position in contact with the ground to reduce the load carried by the fixed axles. The lift axle control system is configured to control the raising and lowering of the lift axle. According to a preferred embodiment of the disclosure, the lift axle control system includes a housing and a valve configured to control the flow of air to a lower bag that lowers the lift axle into contact with the ground.

48 Claims, 16 Drawing Sheets

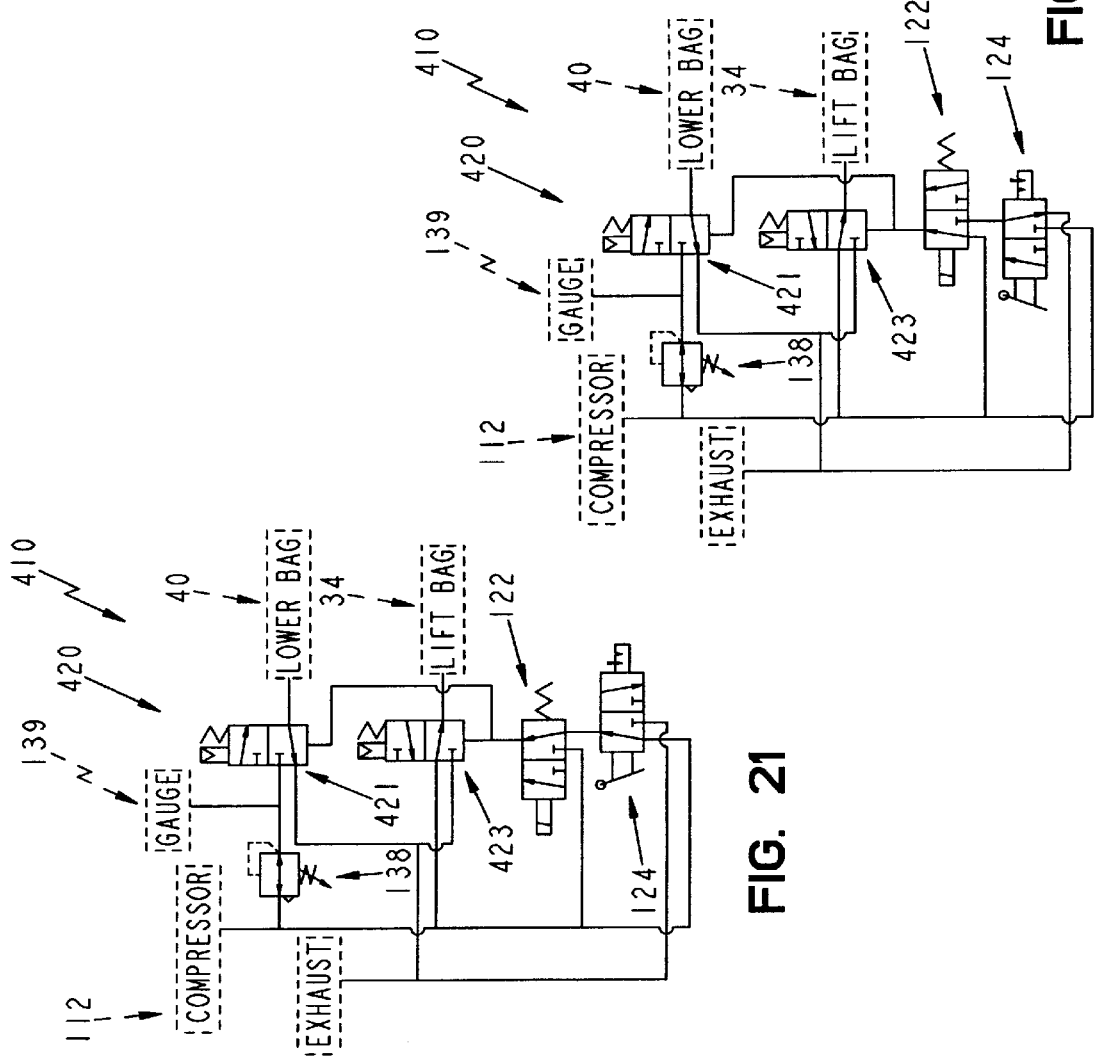

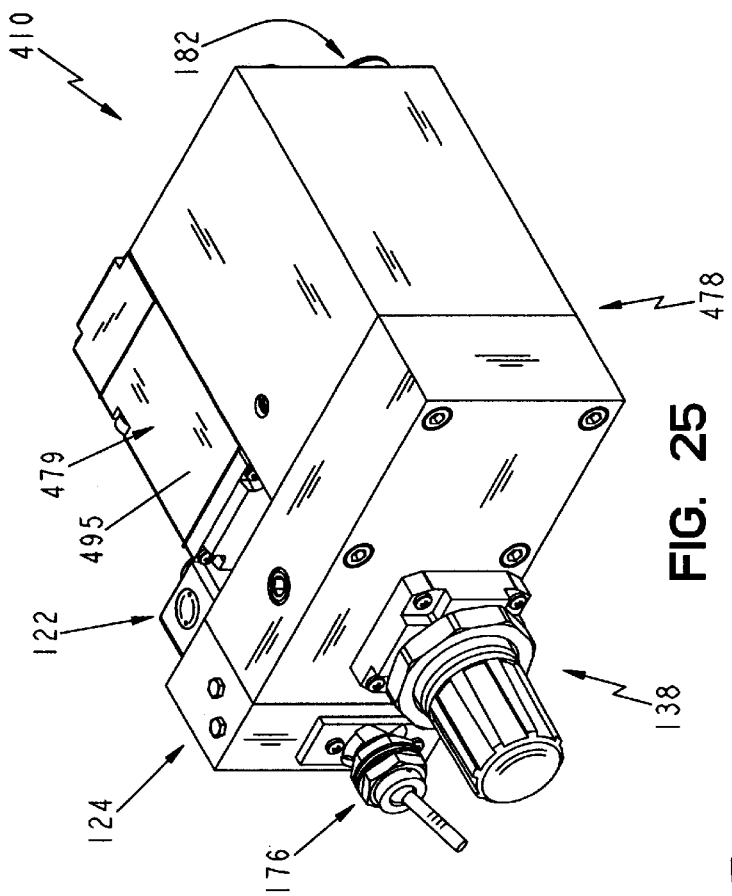
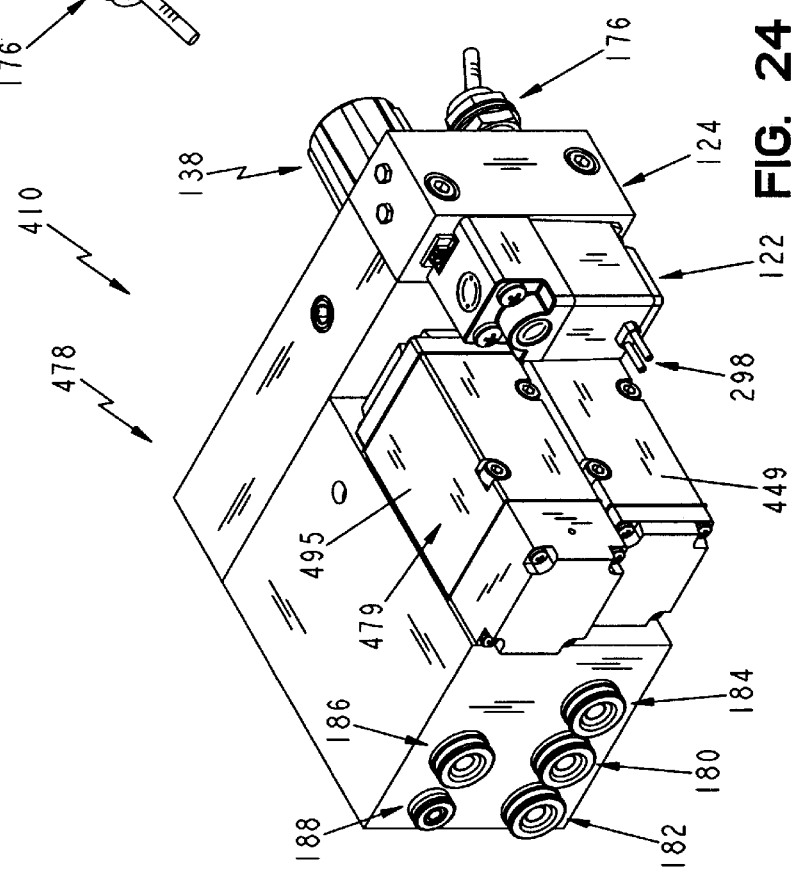

LIFT AXLE CONTROL SYSTEM

BACKGROUND AND SUMMARY

The present invention relates to trucks configured to haul materials. More particularly, the present invention relates to trucks having a lift axle system configured to control the raising and lowering of lift axles.

Many trucks, such as dump trucks, are configured to haul large volumes of material, such as sand, gravel, asphalt, or earth. When loaded with such materials, the overall weight of the vehicles increases significantly. To prevent the weight per/axle ratio from exceeding state regulations, some trucks are provided with an additional axle or axles.

With each additional axle added to such trucks, the operating cost of each truck increases. The overall fuel economy of the trucks decreases because of extra drag and friction caused by the additional axle(s). Furthermore, replacement of the additional tires of the additional axle(s) raises the maintenance costs of each truck.

To lower the operating costs, some trucks are provided with lift axles that are lowered when the truck is loaded and lifted when the truck is not loaded. When lowered, the lift axle supports a portion of the overall vehicle weight and reduces the weight per/axle ratio. When the lift axle is lifted, the tires of the lift axle are not wearing or creating fuel economy-lowering drag on the truck. Thus, by raising the lift axle when not needed, tire wear is reduced and the fuel economy of the truck is raised and the overall cost of operating the truck is reduced.

According to the present invention, a lift axle control system is provided for a vehicle having a forward condition providing forward movement of the vehicle and a reverse condition providing reverse movement of the vehicle. The vehicle includes a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid. The lift axle control system includes a housing, a control valve, and a switch. The control valve is configured to move between a lift position permitting the lift axle mover to move the wheels of the lift axle to the lifted position and a lower position controlling the flow of fluid between the source of pressurized fluid and the lift axle mover to move the wheels of the lift axle to the lowered position. The switch is configured to move between a lift position controlling movement of the control valve to the lift position and a lower position controlling movement of the control valve to the lower position. The switch is configured to automatically move to the lift position when the vehicle is in the reverse condition. The switch is also configured to automatically move to the lower position when the vehicle is out of the reverse condition.

According to another embodiment of the invention, a vehicle is provided that is configured to transport objects. The vehicle includes a chassis, a plurality of fixed axles having wheels normally in contact with the ground to support the chassis and permit movement of the chassis in forward and reverse directions, a vehicle direction controller configured to move between a drive position permitting movement of the chassis in the forward direction and a reverse position permitting movement of the chassis in the reverse direction, a lift axle having wheels movable between a lifted position spaced apart from the ground and a lowered position supporting the chassis, and a lift axle mover configured to move the lift axle between the lifted and lowered positions. The lift axle mover is configured to automatically lower the lift axle upon movement of the vehicle direction controller from the reverse position.

According to another embodiment of the invention, a lift axle control system for a vehicle is provided. The vehicle has a forward condition providing forward movement of the vehicle and a reverse condition providing reverse movement of the vehicle. The vehicle further includes a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid. The lift axle control system includes a housing, a control valve coupled to the housing, and a pressure regulator. The control valve is configured to move between a lift position permitting the lift axle mover to move the wheels of the lift axle to the lifted position and a lower position controlling the flow of fluid between the source of pressurized fluid and the lift axle mover to move the wheels of the lift axle to the lowered position. The pressure regulator is coupled to the housing to control the pressure level of the fluid provided to the lift axle mover from the source of pressurized fluid.

According to another alternative embodiment of the present invention, a lift axle control system for a vehicle is provided. The vehicle has a forward condition providing forward movement of the vehicle and a reverse condition providing reverse movement of the vehicle. The vehicle further includes a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid. The lift axle control system includes a housing, a control valve coupled to the housing, and a first pilot valve. The control valve is configured to move between a lift position controlling the flow of fluid from the source of pressurized fluid to the lift axle mover to move the wheels of the lift axle to the lifted position and a lower position controlling the flow of fluid from the source of pressurized fluid to the lift axle mover to move the wheels of the lift axle to the lowered position. The first pilot valve is coupled to the housing and configured to control movement of the control valve between the lift and lower positions.

According to another embodiment of the present invention, a lift axle control system is provided that is configured to control raising and lowering of a lift axle of a vehicle. The vehicle includes a lift bag positioned to raise the lift axle, a lower bag configured to lower the lift axle, and a source of pressurized fluid. The lift axle control system includes a housing and a control valve. The housing includes a lift bag port in fluid communication with the lift bag, a lower bag port in fluid communication with the lower bag, and a source port in fluid communication with the source of pressurized fluid. The control valve is configured to control the flow of fluid from the source of pressurized fluid to the lift and lower bags of the vehicle. The control valve is configured to automatically move to a lift position providing fluid from the source of pressurized fluid to the lift bag and exhausting the lower bag when the vehicle is placed in reverse. The valve is configured to automatically move to a lower position providing fluid from the source of pressurized fluid to the lower bag and exhausting the lift bag when the vehicle is taken out of reverse.

Additional features of the disclosure will become apparent to those skilled in the art upon consideration of the following detailed description when taken in conjunction with the accompanying drawings.

BRIEF DESCRIPTION OF THE DRAWINGS

The detailed description particularly refers to the accompanying figures in which:

FIG. 4 is a diagrammatic view of the preferred embodiment lift axle control system including a control valve (shown in a vertical orientation), a first pilot valve (positioned below the control valve), and a second pilot valve (positioned below the first pilot valve) showing the first and second pilot valves in lower positions so that the control valve is also in a lower position providing air to the lower bag to lower the lift axle and exhausting the lift device or lift bag;

FIG. 5 is a view similar to FIG. 4 showing the second pilot valve in a lift position so that the control valve is also in a lift position providing air to the lift bag to raise the lift axle and exhausting the lower bag;

FIG. 6 is a view similar to FIG. 4 showing the second pilot valve in the lower position and the first pilot valve in a lift position so that the control valve is also in the lift position providing air to the lift bag to raise the lift axle and exhausting the lower bag;

FIG. 7 is a view similar to FIG. 4 showing the first and second pilot valves in the lift positions so that the control valve is also in the lift position providing air to the lift bag to raise the lift axle and exhausting the lower bag;

FIGS. 20–23 are diagrammatic views of another alternative embodiment lift axle control system configured to control raising and lowering of the lift axle;

FIG. 20 is a diagrammatic view of the alternative embodiment lift axle control system including a lower bag control valve (shown coupled to the lower bag), a lift bag control valve (shown coupled to the lift bag), a first pilot valve (positioned below the lift bag control valve), and a second pilot valve (positioned below the first pilot valve) showing the first and second pilot valves in lower positions so that the lower bag control valve is also in a lower position providing air to the lower bag and the lift bag control valve is in a lower position exhausting the lift bag to lower the lift axle;

FIG. 21 is a view similar to FIG. 20 showing the second pilot valve in a lift position so that the lower bag control valve is also in a lift position exhausting the lower bag and the lift bag control valve is also in a lift position providing air to the lift bag to raise the lift axle;

FIG. 22 is a view similar to FIG. 20 showing the second pilot valve in the lower position and the first pilot valve in a lift position so that the lower bag control valve is also in the lift position exhausting the lower bag and the lift bag control valve is also in the lift position providing air to the lift bag to raise the lift axle;

FIG. 23 is a view similar to FIG. 20 showing the first and second pilot valves in the lift position so that the lower bag control valve is also in the lift position exhausting the lower bag and the lift bag control valve is also in the lift position providing air to the lift bag to raise the lift axle;

FIG. 24 is a perspective view of the lift axle control system of FIG. 20; and

FIG. 25 is another perspective view of the lift axle control system of FIG. 20.

DETAILED DESCRIPTION OF THE DRAWINGS

Figure 1:
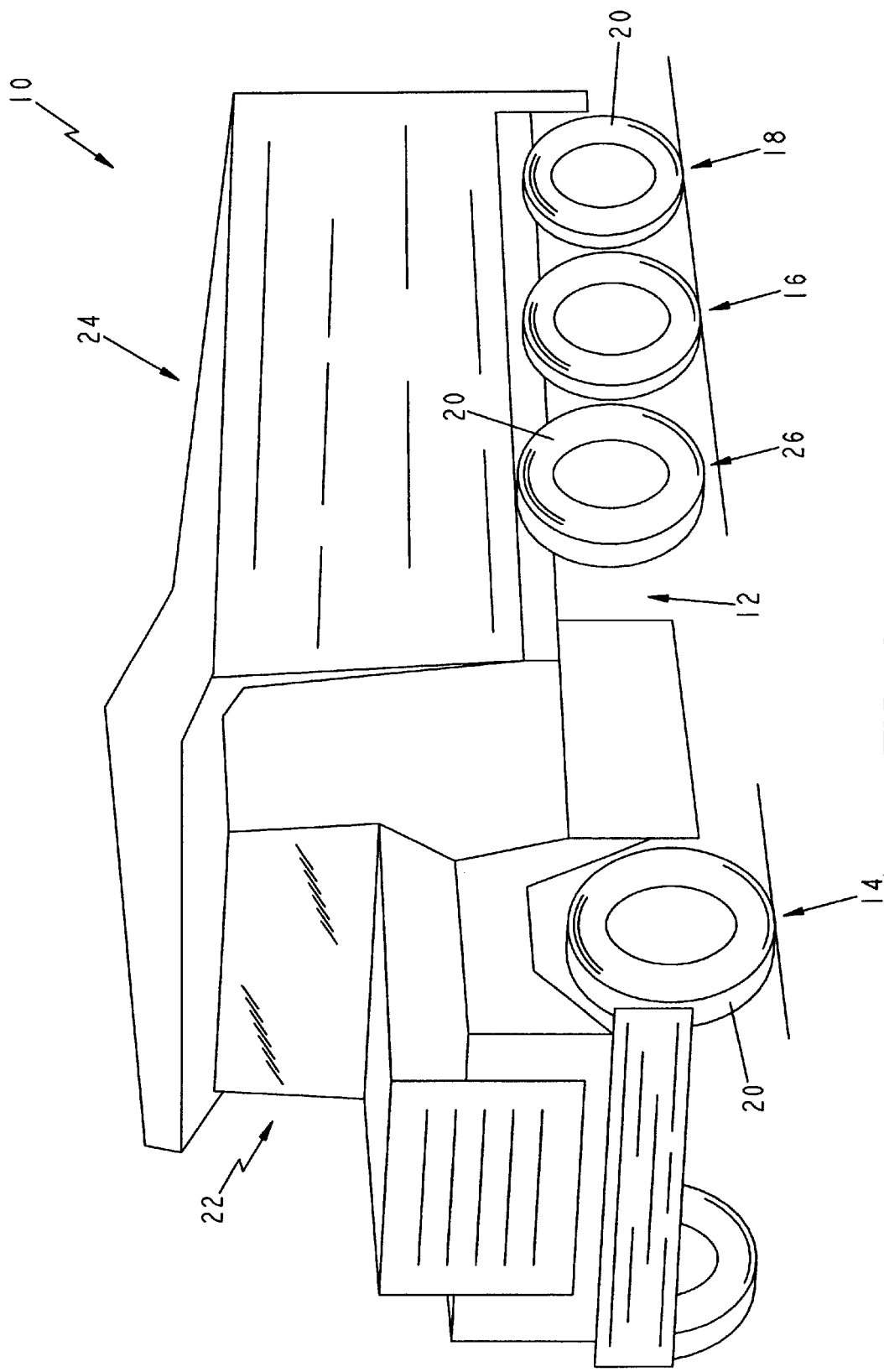
FIG. 1 is a perspective view of a dump truck showing the dump truck including a chassis, a front axle having wheels, first and second rear axles having wheels, and a lift axle positioned between the front axle and the rear axles and having wheels spaced apart from the ground.

A dump truck or vehicle 10 is shown in FIG. 1. Vehicle 10 is configured to haul large volumes of heavy materials, such as sand, gravel, asphalt, or earth. Vehicle 10 includes a chassis 12 and front and rear fixed axles 14, 16, 18 having wheels 20 configured to support chassis 12 on the ground. Chassis 12 supports a driver cab 22 from which a driver operates vehicle 10. Chassis 12 also supports a dump body 24 that has a large volume to hold the heavy materials being transported by vehicle 10.

Figure 2:
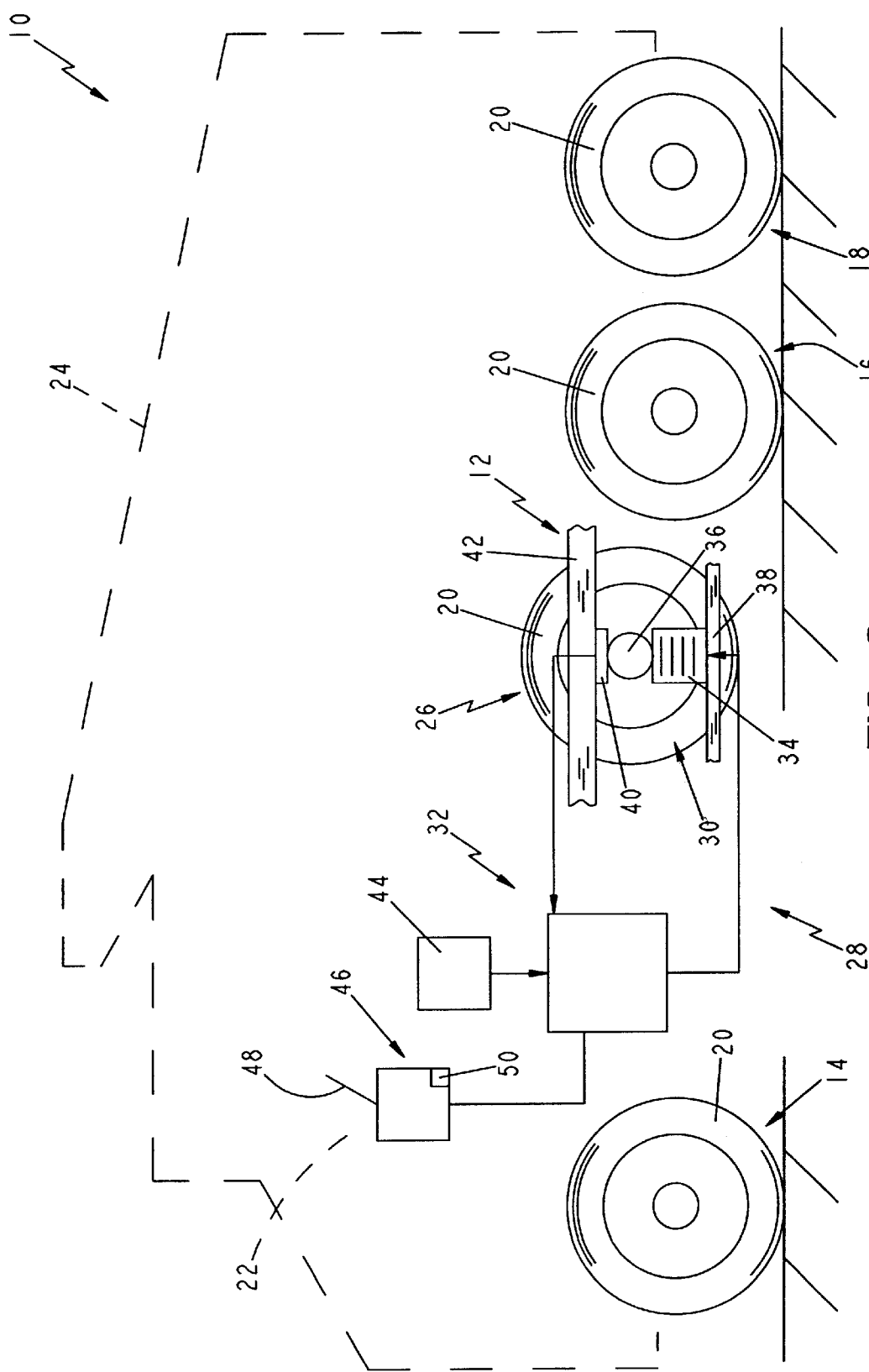
FIG. 2 is a diagrammatic view of the dump truck of FIG. 1 showing the lift axle supported by a lift device in a lifted position with the wheel of the lift axle spaced apart from the ground and a deflated lower bag positioned between the axle and a portion of the chassis.
Figure 3:
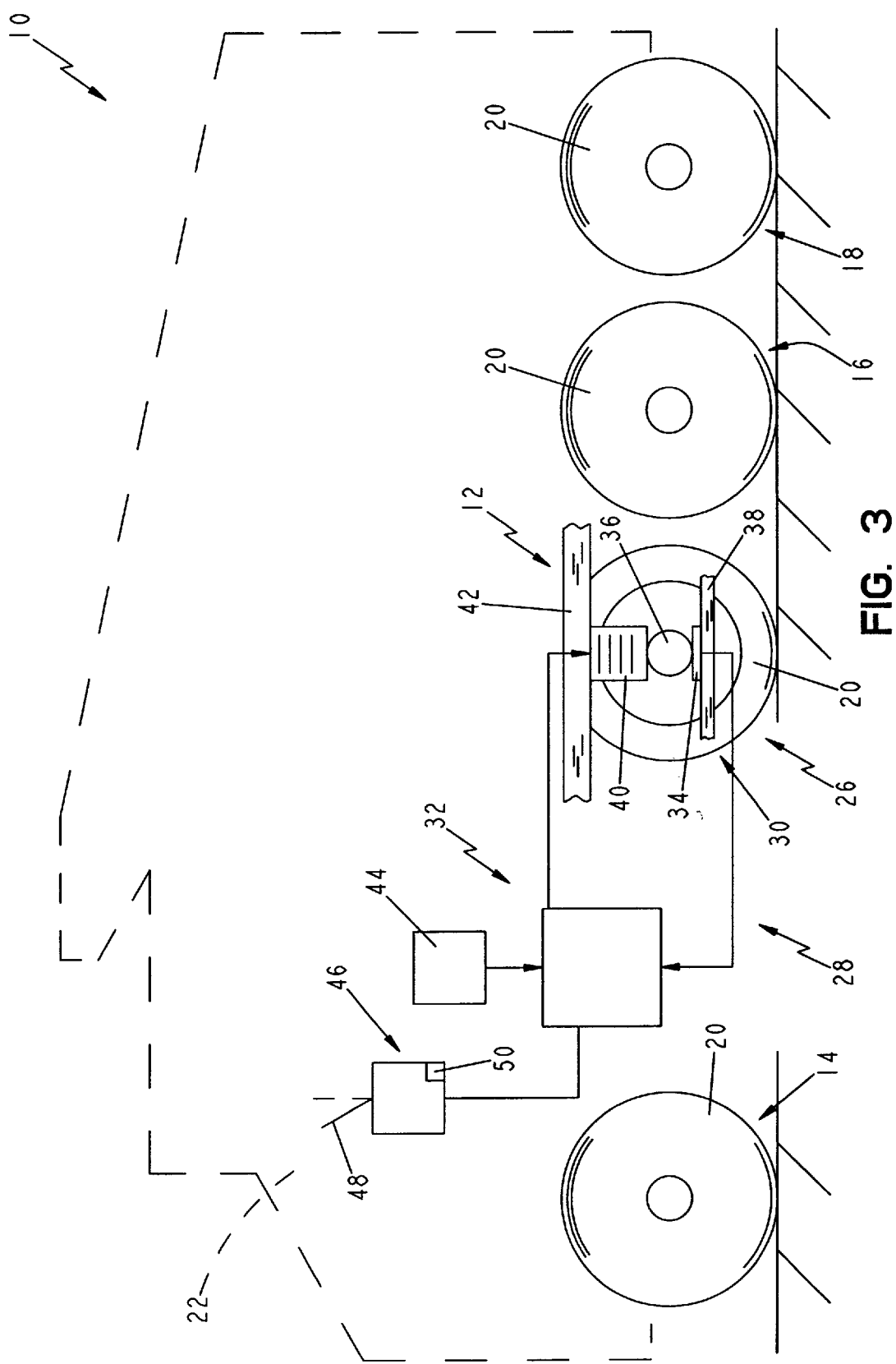
FIG. 3 is a view similar to FIG. 2 showing the lift axle lowered with the wheel of the lift axle in contact with the ground and the lower bag inflated to support the portion of the chassis on the lift axle.

When dump body 24 is loaded, the overall weight of vehicle 10 increases significantly. If enough weight is added, vehicle 10 may not be in compliance with state weight per-axle limits. To bring vehicle 10 back into compliance with the weight per-axle limits, vehicle 10 is provided with a lift axle 26 having wheels 20 that are lowered from a raised position, as shown in FIGS. 1 and 2, to a lowered position, as shown in FIG. 3, to carry a portion of the load and reduce the load carried by fixed axles 14, 16, 18. By reducing the load carried by the other axles 14, 16, 18, vehicle 10 is brought back into compliance with the state weight per-axle limits.

When lift axle 26 is lowered, the operating cost of vehicle 10 increases. The overall fuel economy of vehicle 10 decreases because of extra drag and friction caused by wheels 20 of lift axle 26. Furthermore, when lift axle 26 is lowered, wheels 20 of lift axle 26 wear and eventually require replacement and additional expense.

To lower the operating costs, lift axle 26 is moved to the raised position when vehicle 10 is not loaded. When lift axle 26 is lifted, wheels 20 of lift axle 26 are not wearing or creating fuel economy-lowering drag on vehicle 10. Thus, by raising lift axle 26 when not needed, tire wear is reduced and the fuel economy is raised and the overall costs of operating vehicle 10 are reduced.

Under some circumstances, it is also convenient to raise lift axle 26 when vehicle 10 is loaded. For example, when vehicle 10 is moving in reverse, lift axle 26 may bind. Thus, to help prevent lift axle 26 from binding when vehicle 10 is moving in reverse, lift axle 26 is raised.

As shown in FIG. 2, vehicle 10 further includes a lift axle mover 28 configured to raise and lower lift axle 26. Lift axle mover 28 includes a lift axle actuator 30 configured to power the movement of lift axle 26 between the raised and lowered positions and a lift axle control system 32 configured to control lift axle actuator 30.

Lift axle actuator 30 includes a lift device or lift bag 34 positioned between a shaft or axle 36 and a lower portion 38 of chassis 12 and a lower device or lower bag 40 positioned between shaft 36 and an upper portion 42 of chassis 12. Lift bag 34 is configured to inflate to raise shaft 36 and attached wheels 20 of lift axle 26 while lower bag 40 deflates. Similarly, lower bag 40 is configured to inflate to lower shaft 36 and attached wheels 20 of lift axle 26 into contact with the ground while lift bag 34 deflates. According to alternative embodiments of the present disclosure, other configurations of lift and lower devices are provided. For example, according to one alternative embodiment of the present disclosure, the lift device is a spring. Other configurations of suitable lift axle actuators are provided in U.S. Pat. Nos. 4,854,409; 4,903,973; 4,944,526; 5,230,528; 5,505,481; 5,549,322; 5,778,798; 6,062,578; 6,073,946, the disclosures of which are expressly incorporated by reference herein.

Lift axle control system 32 is provided to control the inflation and deflation of lift and lower bags 34, 40. As shown in FIG. 2, vehicle 10 includes a source of pressurized fluid 44, such as an air compressor. Lift axle control system 32 is coupled to source of pressurized fluid 44 and lift and lower bags 34, 40 to control the flow of air or other fluid therebetween. To raise lift axle 26, lift axle control system 32 provides air to lift bag 34 from source of pressurized fluid 44 and exhausts lower bag 40 as shown in FIG. 2. To lower lift axle 26, lift axle control system 32 provides air to lower bag 40 from source of pressurized fluid 44 and exhausts lift bag 34 as shown in FIG. 3.

According to the preferred embodiment of the present disclosure, lift axle control system 32 is configured to automatically raise and lower lift axle 26 when vehicle 10 is placed into and taken out of reverse. Therefore, when vehicle 10 is placed in reverse, lift axle control system 32 automatically inflates lift bag 34 and exhausts lower bag 40 to raise lift axle 26 and avoid potential binding of lift axle 26. When vehicle 10 is taken out of reverse, lift axle control system 32 automatically inflates lower bag 40 and exhausts lift bag 34 to lower lift axle 26 and reduce the weight-per axle ratio. According to alternative embodiments of the present disclosure, the lift axle control system requires manual activation by an operator to lift and lower the lift axle.

As shown in FIG. 2, vehicle 10 further includes a vehicle direction controller 46, such as a gear selector for an automatic transmission or a gear shift for a manual transmission. Vehicle direction controller 46 is configured to control the direction of travel of vehicle 10. Vehicle direction controller 46 moves between forward, neutral, and reverse positions. When in the forward position, vehicle 10 is enabled to move forward. For example, after vehicle direction control 46 is placed in the forward position, vehicle is enabled to move in the forward direction after the driver releases the clutch for a manual transmission or takes their foot off the brake for an automatic transmission. When in the reverse position, vehicle 10 is enabled to move in reverse. When in the neutral or park position, the vehicle remains stationary.

According to the preferred embodiment of the present disclosure, lift axle control system 32 is configured to automatically activate raising and lowering of lift axle 26 when vehicle direction controller 46 is in and not in the reverse position. For example, if a handle 48 of vehicle direction controller 46 is moved to a reverse position, as shown in FIG. 2, when vehicle controller 46 is in the reverse position, lift axle control system 32 automatically inflates lift bag 34 and deflates lower bag 40 to automatically raise lift axle 26. When handle 48 is moved out of the reverse position to the forward or neutral positions, as shown in FIG. 3, lift axle control system 32 automatically inflates lower bag 40 and deflates lift bag 34 to lower lift axle 26.

Preferably, lift axle control system 32 activates when an electrical component 50 of vehicle direction controller 46 is powered or charged to automatically raise and lower lift axle 26. According to the preferred embodiment of the present disclosure, electrical component 50 is a component of the reverse light system (not shown) of vehicle 10. When vehicle direction controller 46 is placed in the reverse condition, electrical component 50 changes from a non-reverse state to a reverse state when the reverse light system is energized to light the reverse lights (not shown) of vehicle 10. Lift axle control system 32 activates based on this state or change in state to automatically raise lift axle 26. When electrical component 50 is no longer in this state or changes state again, lift axle control system 32 lowers lift axle 26.

According to alternative embodiments of the present disclosure, the state of other electrical components of the vehicle cause activation of the lift axle control system, such as the reverse warning beeper or other electrical components that change state when the vehicle is placed in reverse. According to other alternative embodiments of the present disclosure, the lift axle controller is configured to activate upon movement of mechanical or other components that change position when the vehicle is put into reverse such as the gear shifter/selector handle. Therefore, when the lift axle controller system is acted upon, senses, or detects that the vehicle is placed in reverse, the lift axle is automatically raised, and when the vehicle is taken out of reverse, the lift axle is automatically lowered.

Figure 4:
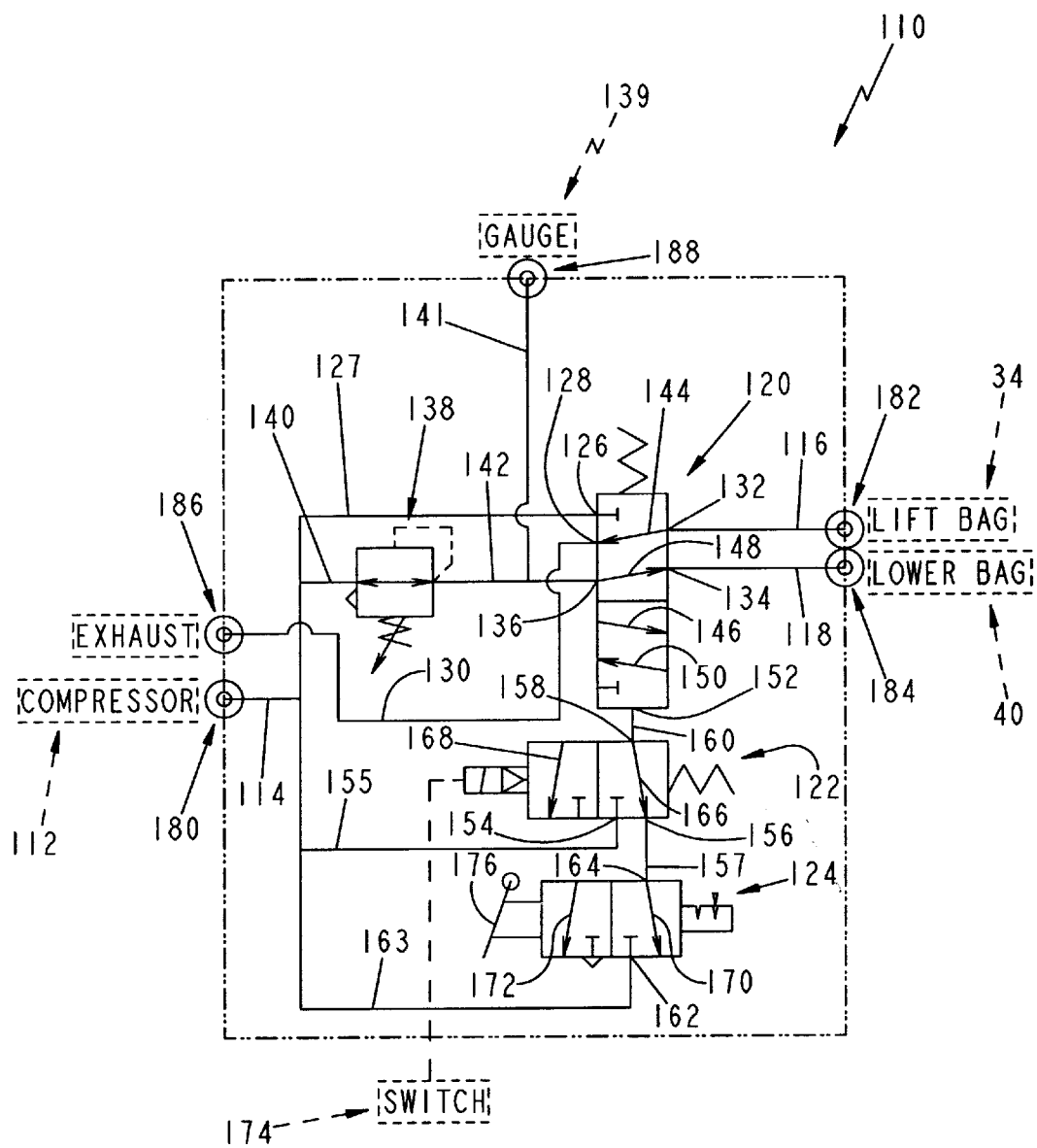
FIGS. 4–7 are diagrammatic views of a preferred embodiment lift axle control system configured to control raising and lowering of the lift axle.

A diagram of a preferred embodiment lift axle control system 110 is provided in FIG. 4. Lift axle control system 110 is provided to control the inflation and deflation of lift and lower bags 34, 40. Lift axle control system 110 is configured to automatically raise and lower lift axle 26 when vehicle 10 is placed into and taken out of reverse. Therefore, when vehicle 10 is placed in reverse, lift axle control system 110 automatically inflates lift bag 34 and exhausts lower bag 40 to raise lift axle 26 and avoid binding of lift axle 26. When vehicle 10 is taken out of reverse, lift axle control system 110 automatically inflates lower bag 40 and exhaust lift bag 34 to lower lift axle 26 and reduce the weight-per axle ratio.

Lift axle control system 110 includes a compressor passage 114 that communicates with an air compressor 112. Lift axle control system 110 further includes lift and lower bag passages 116, 118 that communicate with lift and lower bags 34, 40 to control the flow of air from air compressor 112 to lift and lower bags 34, 40. Similarly, lift axle control system 110 controls the flow of air from lift and lower bags 34, 40 through lift and lower bag passages 116, 118 to deflate lift and lower bags 34, 40.

To raise lift axle 26, lift axle control system 110 provides air to lift bag 34 from air compressor 112 through lift bag passage 116 and exhausts lower bag 40 through lower bag passage 118. To lower lift axle 26, lift axle control system 110 provides air to lower bag 40 from air compressor 112 through lower bag passage 118 and exhausts lift bag 34 through lift bag passage 116.

Figure 5:
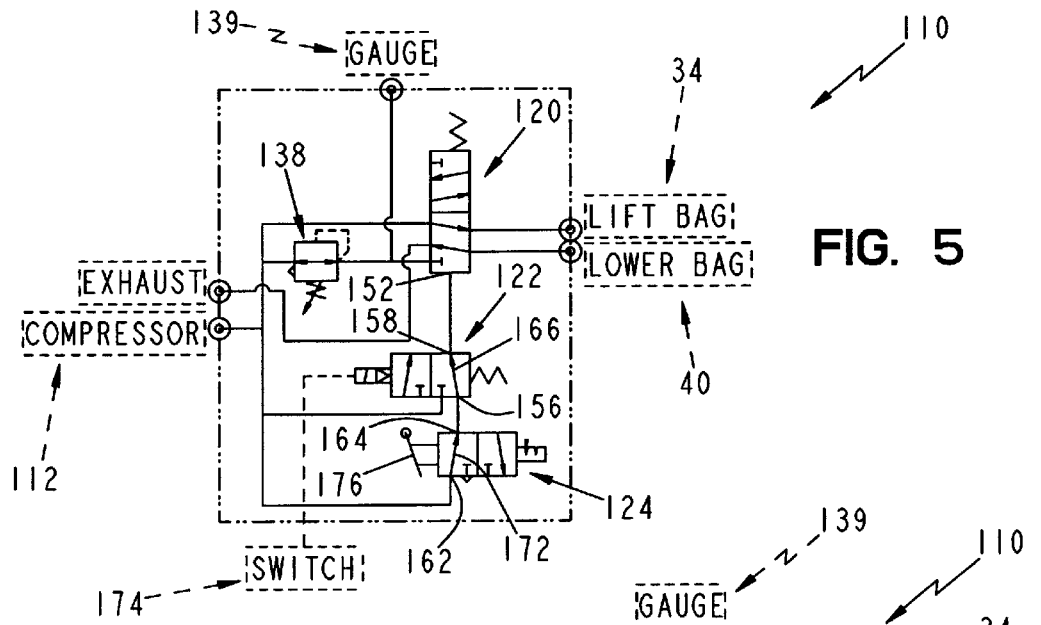
Figure 6:
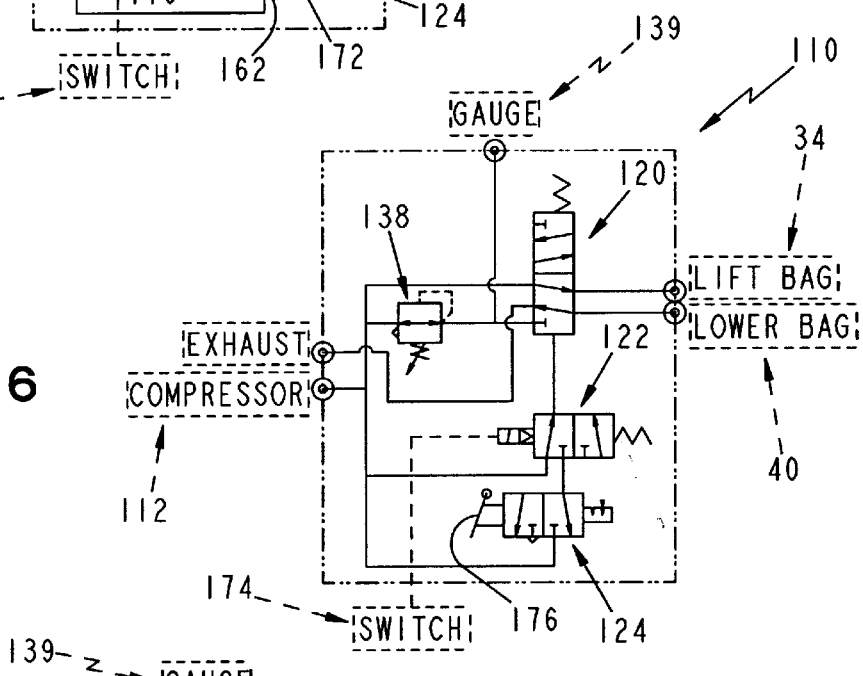
Figure 7:
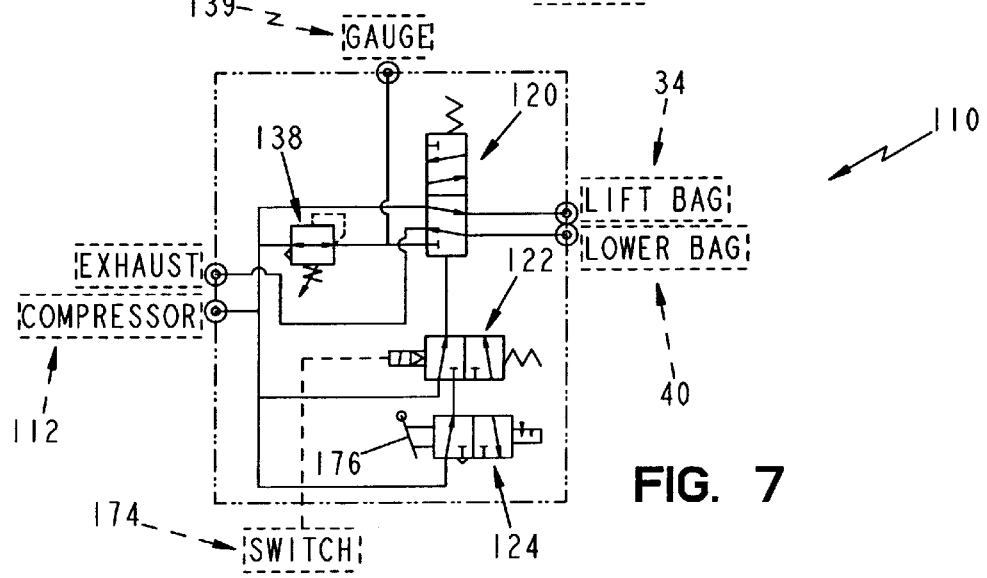

Lift axle control system 110 further includes a control valve 120, a first or solenoid-operated pilot valve 122 coupled to control valve 120 and compressor 112, and a second or mechanically-operated pilot valve 124 coupled to first pilot valve 122 and compressor 112. Control valve 120 is configured to direct the flow of air to and from lift and lower bags 34, 40. Control valve 120 moves between a lower position, as shown in FIG. 4, directing pressurized air to lower bag 40 and exhausting lift bag 34 and a lift position, as shown in FIGS. 5–7, directing pressurized air to lift bag 34 and exhausting lower bag 40.

First and second pilot valves 122, 124 are configured to control the position of control valve 120. First pilot valve 122 moves between a first position, as shown in FIGS. 4 and 5, and a second position, as shown in FIGS. 6 and 7. Similarly, second pilot valve 124 moves between a first position, as shown in FIGS. 4 and 6, and a second position, as shown in FIGS. 5 and 7. When either of first and second pilot valves 122, 124 are in the second position, as shown in FIGS. 5–7, control valve 120 moves to the lift position to inflate lift bag 34 and exhaust lower bag 40 to raise lift axle 26. Therefore, both first and second pilot valves 122, 124 must be in the first position, as shown in FIG. 4, before control valve 120 will move to the lower position to inflate lower bag 40 and exhaust lift bag 34 to lower lift axle 26.

As shown in FIG. 4, control valve 120 includes a compressor port 126 in communication with compressor passage 114 through another compressor passage 127, an exhaust port 128 in communication with an exhaust passage 130 that exhausts to the atmosphere, a lift bag port 132 in communication with lift bag passage 116, a lower bag port 134 in communication with lower bag passage 118, and a regulator port 136. Lift axle control system 110 further includes an air pressure regulator 138 configured to provide air to regulator port 136 at a predetermined pressure. Air pressure regulator 138 receives pressurized air from compressor 112 through a compressor passage 140 and delivers regulated air to regulator port 136 through a regulator passage 142 as shown in FIG. 4.

Lift axle control system 110 further includes a gauge 139 normally positioned in cab 22. Gauge 139 communicates with air pressure regulator 138 through a gauge passage 141. A driver monitors gauge 139 to determine if an appropriate amount of pressure is being provided to lower bag 40 by air pressure regulator 138.

As shown in FIG. 4, control valve 120 further includes a plurality of flow passages that align with selected ports 126, 128, 132, 134, 136 when control valve 120 is in either the lift or lower positions. For example, control valve 120 includes a first lift bag passage 144 that aligns with exhaust port 128 when control valve 120 is in the lower position and a second lift bag passage 146 that aligns with compressor port 126 when control valve 120 is in the lift position. Furthermore, control valve 120 includes a first lower bag passage 148 that aligns with regulator port 136 when control valve 120 is in the lower position and a second lower bag passage 150 that aligns with exhaust port 128 when control valve 120 is in the lift position.

When control valve 120 is in the lower position, regulated air from air pressure regulator 138 is delivered to lower bag 40 through first lower bag passage 148 and air exhausts from lift bag 34 to the atmosphere through first lift bag passage 144 as shown in FIG. 4 to lower lift axle 26. Similarly, when control valve 120 is in the lift position, pressurized air from air compressor 112 is delivered to lift bag 34 through second lift bag passage 146 and air exhausts from lower bag 40 to the atmosphere through second lower bag passage 150 as shown in FIGS. 5–7 to raise lift axle 26.

Control valve 120 further includes a control port 152 configured to receive pressurized air. When pressurized air is applied to control port 152, control valve 120 moves to the raise position as shown in FIGS. 5–7. When pressurized air is no longer provided to control port 152, control valve 120 moves to the lower position as shown in FIG. 4.

First and second pilot valves 122, 124 are configured to control the application of pressurized air to control port 152 to control the position of control valve 120. First pilot valve 122 includes a compressor port 154 in communication with compressor 112 through a compressor passage 155, a second pilot valve port 156 in communication with second pilot valve 124 through a pilot valve passage 157, and a control valve port 158 in communication with control port 152 of control valve 120 through a control line 160. Second pilot valve 124 includes a compressor port 162 in communication with compressor 112 through a compressor passage 163 and a first pilot valve port 164 in communication with first pilot valve 122 through pilot valve passage 157.

First and second pilot valves 122, 124 further include air passages that align with respective ports 154, 156, 158, 162, 164 when first and second pilot valves 122, 124 are either in the first or second positions. For example, first pilot valve 122 includes a first passage 166 that aligns with second pilot valve port 156 and control valve port 158 when first pilot valve 122 is in the first position, as shown in FIG. 4, and a second passage 168 that aligns with compressor port 154 and control valve port 158 when first pilot valve 122 is in the second position, as shown in FIG. 6. Second pilot valve 124 includes a first passage 170 that aligns with first pilot valve port 164 when second pilot valve 124 is in the first position, as shown in FIG. 4, and a second passage 172 that aligns with compressor port 162 and first pilot valve port 164 when second pilot valve 124 is in the second position, as shown in FIG. 5.

As shown in FIG. 4, when first and second pilot valves 122, 124 are both in the first position, first passage 166 of first pilot valve 122 aligns with control valve port 158 and second pilot valve port 156 and first passage 170 of second pilot valve 124 aligns with first pilot valve port 164 so that no pressure is applied to control port 152 of control valve 120. Thus, control valve 120 moves to the lower position. Furthermore, any pressure that may have existed at control port 152 is vented through first passages 166, 170 of first and second pilot valves 122, 124.

As shown in FIG. 5, when first pilot valve 122 is in the first position and second pilot valve 124 is in the second position, first passage 166 of first pilot valve 122 aligns with control valve port 158 and second pilot valve port 156 and second passage 172 of second pilot valve 124 aligns with compressor port 162 and first pilot valve port 164 so that pressure from compressor 112 is applied to control port 152 of control valve 120 through first passage 166 of first pilot valve 122 and second passage 172 of second pilot valve 124. Thus, control valve 120 moves to the raise position to raise lift axle 26.

As shown in FIGS. 6 and 7, when first pilot valve 122 is in the second position, second passage 168 of first pilot valve 122 aligns with compressor port 154 and control valve port 158 so that pressure from compressor 112 is applied to control port 152 of control valve 120 through second passage 168 of first pilot valve 122. Thus, when first pilot valve 122 is in the second position, control valve 120 moves to the raised position to raise lift axle 26 regardless of the position of second pilot valve 124. Similarly, when second pilot valve 124 is in the second position, as shown in FIGS. 5 and 7, control valve 120 moves to the raise position to raise lift axle 26 regardless of the position of the first pilot valve 122.

Lift axle control system 110 further includes an electric switch 174 that controls movement of first pilot valve 122. As previously mentioned, first pilot valve 122 is solenoid operated. Switch 174 moves between an activated state or position activating the solenoid (not shown) of first pilot valve 122 and a de-activated state or position de-activating the solenoid. When the solenoid is activated by switch 174, first pilot valve 122 is moved to the second position to raise lift axle 26. When the solenoid is de-activated by switch 174, first pilot valve 122 is moved to the first position and lift axle 26 is lowered if second pilot valve 124 is also in the first position or remains in the raised position if second pilot valve 124 is in the second position.

According to the preferred embodiment of the present disclosure, switch 174 is moved between the activated and de-activated states by electrical component 50 of vehicle direction controller 46. When vehicle direction controller 46 moves to the reverse position, electrical component 50 moves switch 174 to the activated state to move first pilot valve 122 to the second position and raise lift axle 26. Thus, when vehicle direction controller 46 moves to the reverse position, lift axle 26 is automatically raised. When vehicle direction controller 46 moves out of the reverse position, electrical component 50 moves switch 174 to the de-activated state to move first pilot valve 122 to the first position and lower lift axle 26 if second pilot valve 124 is also in the first position.

According to alternative embodiments of the present disclosure, a component of the vehicle direction controller performs as a switch that applies a voltage, current, or charge to activate or move the solenoid of the first pilot valve. For example, according to one alternative embodiment of the present disclosure, the solenoid is driven by the electrical circuit for the reverse lights of the vehicle. The electrical lines of the circuit that deliver voltage to the reverse lights are tapped so that when the reverse lights are lit, the solenoid is activated. When the voltage to the electrical lines to the reverse lights is dropped, the solenoid is de-activated.

Lift axle control system 110 further includes a mechanical toggle switch 176 that controls movement of second pilot valve 124. As previously mentioned, second pilot valve 124 is mechanically operated. Switch 176 moves between first and second positions to move second pilot valve 124 between the first and second positions to raise and lower lift axle 26 if first pilot valve 122 is in the first position.

According to the preferred embodiment of the present disclosure, toggle switch 176 is configured to override the automatic lowering of lift axle 26 by electrical switch 174 when vehicle 10 is taken out of reverse. For example, if vehicle direction controller 46 is placed in the forward or neutral positions, electrical switch 174 will automatically move first pilot valve 122 to the first position. However, if toggle switch 176 is moved to the second position to move second pilot valve 124 to the second position, pressurized air is provided to control port 152 of control valve 120 to raise lift axle 26. Thus, if the driver desires to raise lift axle 26 when vehicle 10 is not in reverse, toggle switch 176 is moved to the second position overriding the automatic lowering of lift axle 26 by electrical switch 174. For example, when vehicle 10 is not loaded, the driver can use toggle switch 176 to raise lift axle 26 regardless of whether vehicle 10 is in forward or reverse.

Similarly, electrical switch 174 is configured to override lowering of lift axle 26 by toggle switch 176. If toggle switch 176 is in the first position, second pilot valve 124 is moved to the first position. However, if vehicle direction controller 46 is moved to the reverse position, electrical switch 174 will move first pilot valve 122 to the second position providing pressurized air to control port 152 of control valve 120 to raise lift axle 26.

According to alternative embodiments of the present disclosure, other configurations of switches are provided to move or activate movement of the pilot valves. For example, according to one embodiment of the present disclosure, electrical switches are provided for both the first and second pilot valves. According to other alternative embodiments, pneumatic, hydraulic, other mechanical or toggle switches, or other switches known to those of ordinary skill in the art are provided.

According to alternative embodiments of the present disclosure, other pneumatically, electrically, and manually operated control valves are provided. For example, according to one alternative embodiment of the present disclosure, a solenoid-operated control valve is provided. Logic circuitry is provided to apply voltage, current, or a charge to the solenoid when predetermined vehicle or other conditions, such as those previously described, exist. According to other alternative embodiments, other configurations of pneumatically controlled valves with or without pilot valves are provided.

As shown in FIGS. 8–12, lift axle control system 110 further includes a housing 178 configured to house control valve 120. Air pressure regulator 138 and second pilot valve 124 are directly coupled to housing 178. First pilot valve 122 and toggle switch 176 are directly coupled to second pilot valve 124 and indirectly coupled to housing 178 through second pilot valve 124.

A plurality of exterior ports are provided to communicate air to and from housing 178. For example, an exterior compressor port 180 is provided that couples to an air supply line (not shown) extending to compressor 112. Exterior lift and lower bag ports 182, 184 are provided that couple to air lines (not shown) extending to lift and lower bags 34, 40. An exterior exhaust port 186 is provided that vents to the atmosphere and an exterior gauge port 188 is provided that couples to an air line (not shown) extending to gauge 139.

Figure 13A:
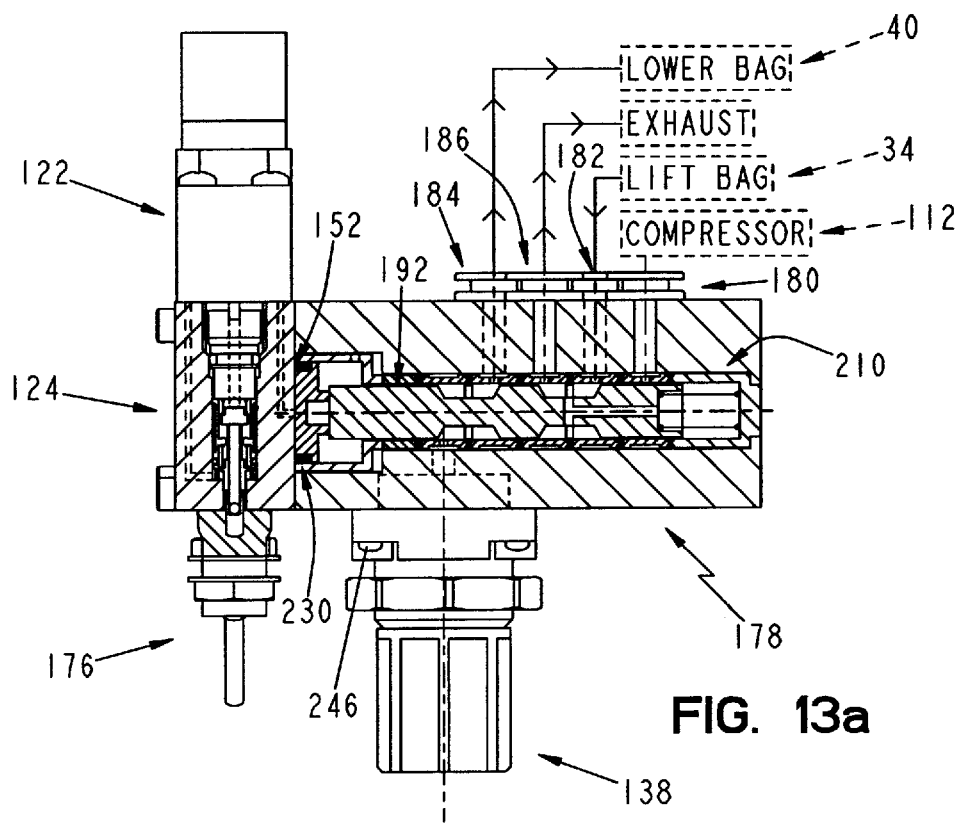
FIG. 13a is a cross-sectional view taken along line 13—13 of FIG. 12 showing the lift axle control system including a housing and the control valve positioned in a lower position providing air to the lower bag and exhausting the lift bag.
Figure 14:
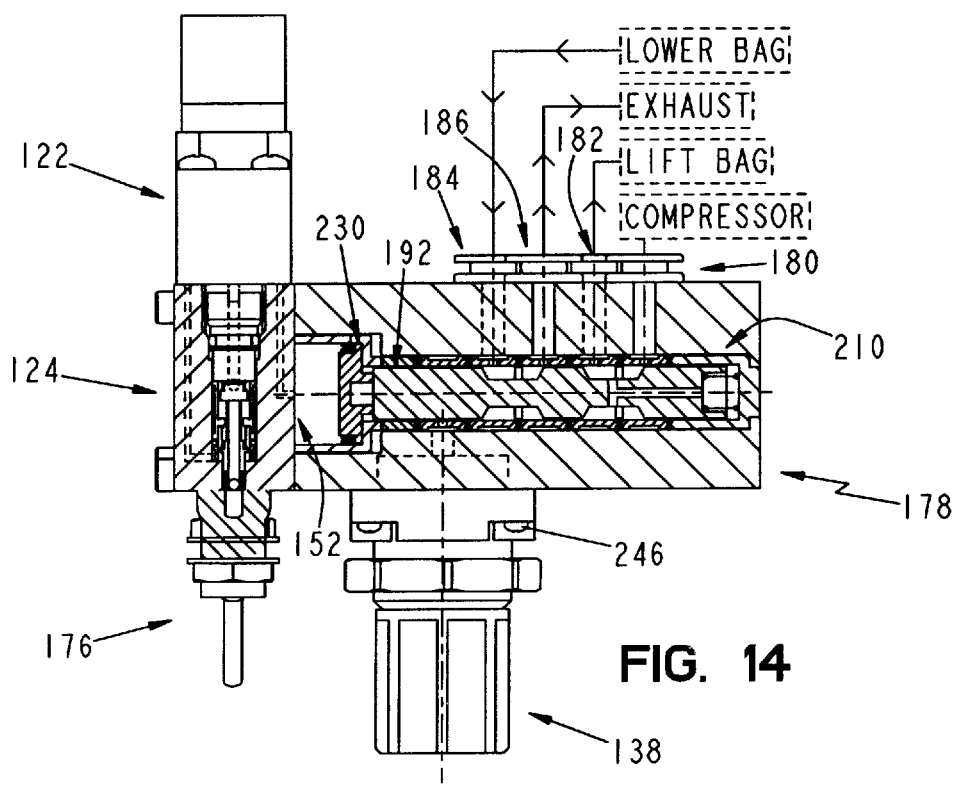
FIG. 14 is a view similar to FIG. 13a showing the control valve positioned in a lift position providing air to the lift bag and exhausting the lower bag.
Figure 13B:
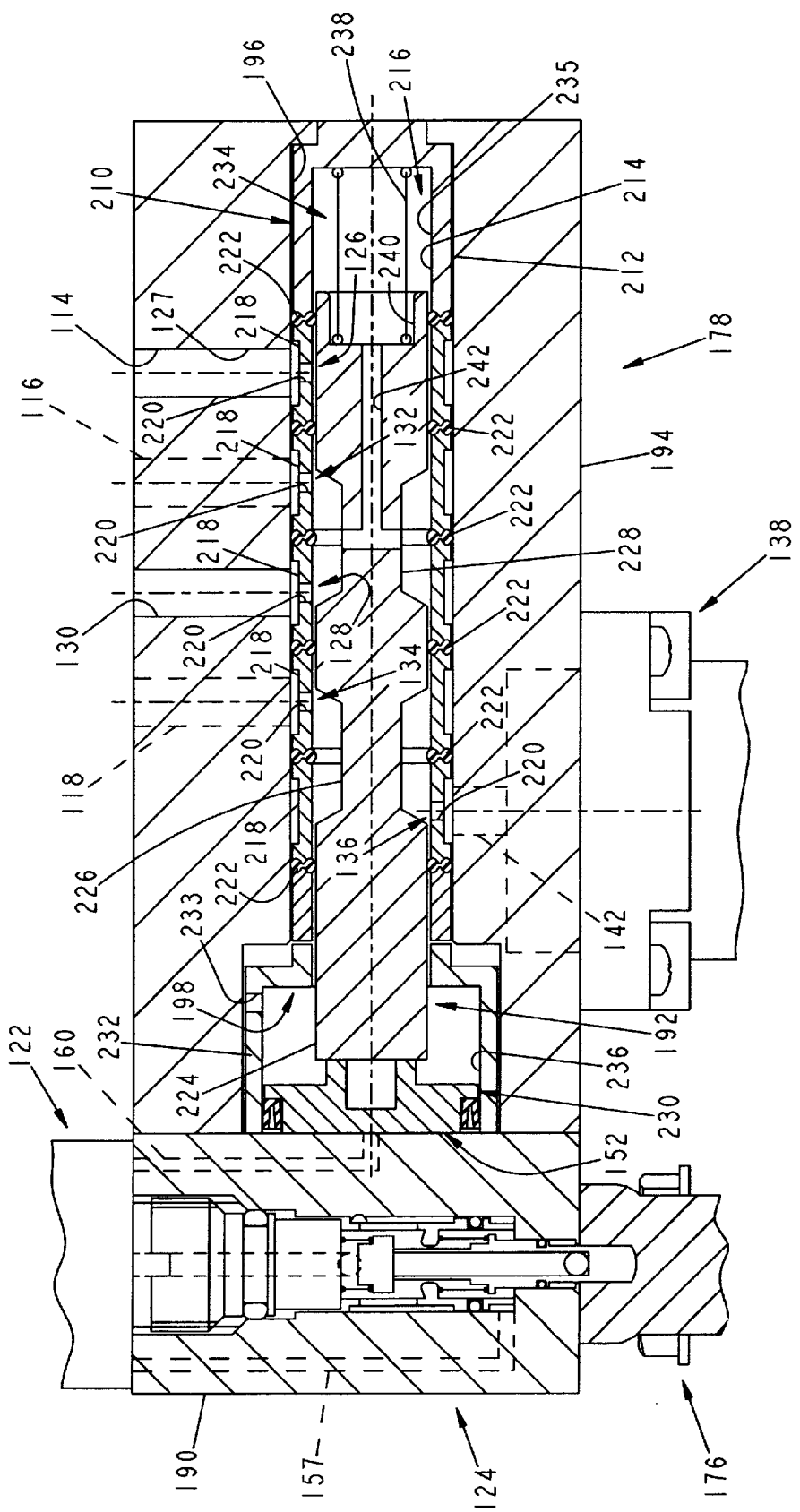
FIG. 13b is an enlarged view of FIG. 13a with portions cut away.
Figure 16:
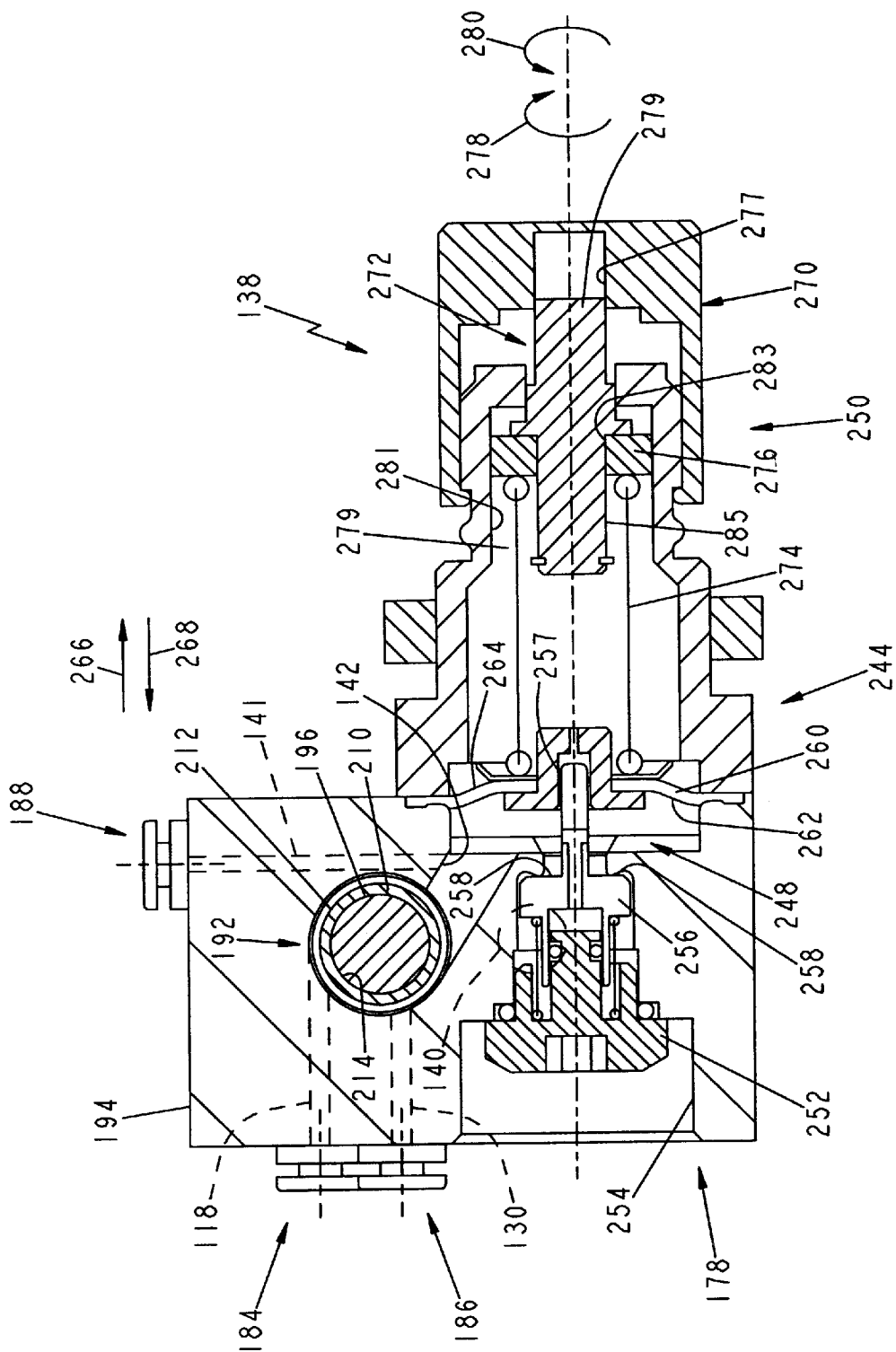
FIG. 16 is a cross-sectional view taken along line 16—16 of FIG. 10 showing a pressure regulator coupled to the housing.

As shown in FIGS. 13a, 13b, and 14, housing 178 includes compressor, lift and lower bag, and exhaust passages 114, 116, 118, 130 that communicate air between exterior compressor, lift and lower bag, and exhaust ports 180, 182, 184, 186 and respective compressor, lift and lower bag, and exhaust ports 126, 132, 134, 128. Lift and lower bag ports 182, 184 and lift and lower passages 116, 118 are shown in FIGS. 13a, 13b, and 14 for illustrative purposes only. The correct elevation of those components is shown in FIG. 16, as shown by lower bag port 184 and lower passage 118. Housing 178 also includes gauge passage 141 that communicates air between regulator 138 and exterior gauge port 188 as shown in FIG. 16.

Figure 15:
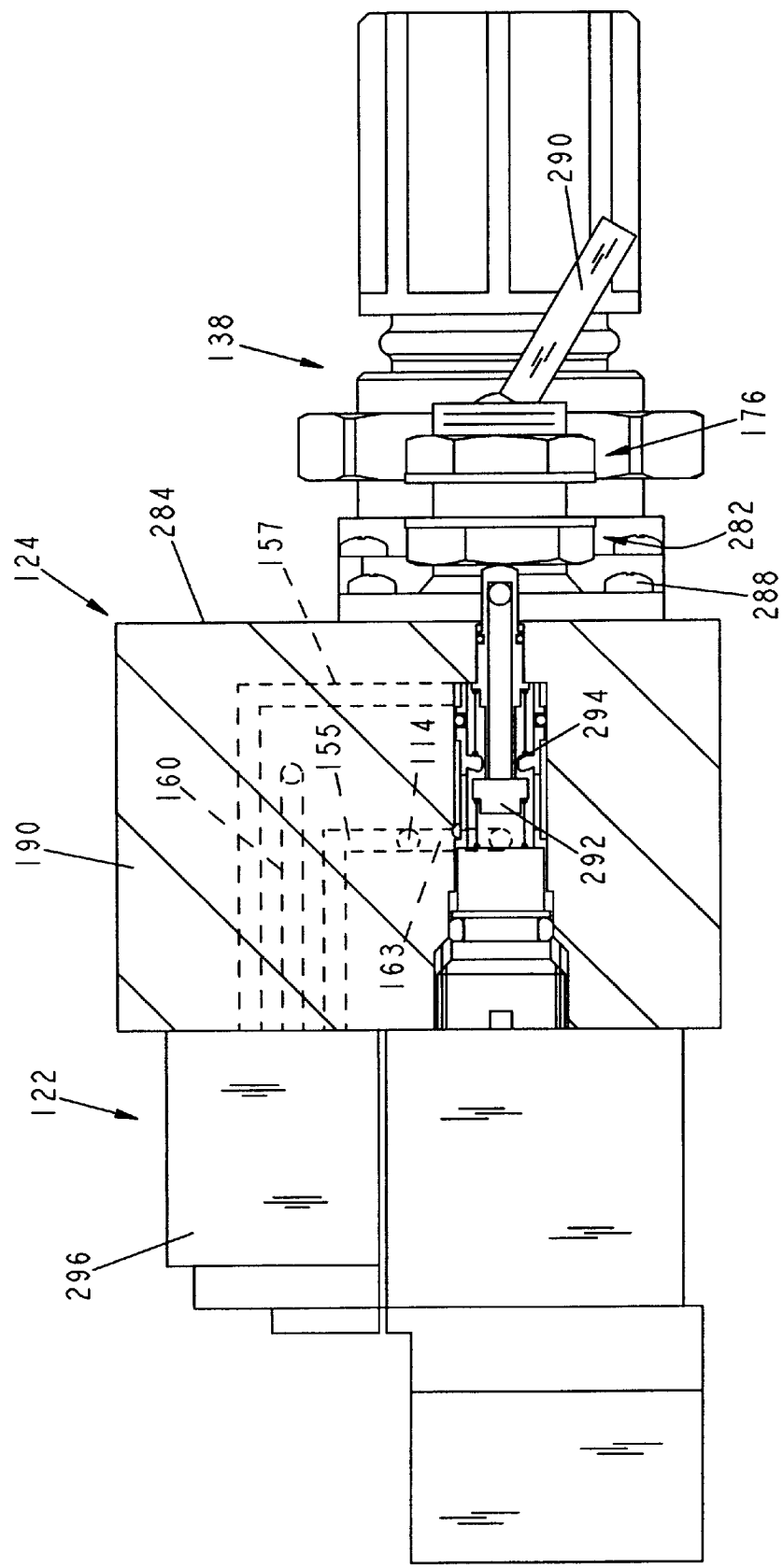
FIG. 15 is a cross-sectional view taken along line 15—15 of FIG. 10 showing a manual toggle switch in a lift position and the second pilot valve in a lift position.

Second pilot valve 124 includes a pilot valve housing 190 that includes pilot valve passage 157 and control valve passage 160 as shown in FIGS. 13a, 13b, and 14. Pilot valve housing 190 further includes compressor passages 155, 163 and a portion of compressor passage 114 providing pressurized air from compressor 112 to compressor passages 155, 163 as shown in FIG. 15.

According to the preferred embodiment of the present disclosure, control valve 120 includes a valve member 192 configured to move between lift and lower positions as shown in FIGS. 13a and 14. Housing 178 includes an outer surface 194 and an inner surface 196 defining an interior region 198 in which valve member 192 is positioned. Control valve 120 further includes a sleeve 210 coupled to housing 178 between valve member 192 and housing 178.

Sleeve 210 includes an outer surface 212 and an inner surface 214 defining an interior region 216 in which valve member 192 is positioned as shown in FIGS. 13b and 16. As shown in FIG. 13b, outer surface 212 includes a plurality of annular grooves 218 in communication with respective compressor, lift and lower bag, and exhaust passages 114, 116, 118, 130. Sleeve 210 further includes a plurality of radially extending apertures 220 that extend from each annular groove 218 to inner surface 214 to define compressor, lift and lower bag, exhaust, and regulator ports 126, 132, 134, 128, 136.

Control valve 120 further includes a plurality of O-rings 222 positioned on each side of annular grooves 218 that extend through sleeve 210 to provide a seal between inner surface 196 of housing 178 and valve member 192. O-rings 222 provide controlled separation between compressor, lift and lower bag, exhaust, and regulator ports 126, 132, 134, 128, 136 and divide sleeve 210 into a plurality of sleeve segments.

Valve member 192 is configured to control communications of air between different ports 126, 132, 134, 128 when in the lift position than when in the lower position. As shown in FIG. 13b, valve member 192 includes an outer surface 224 that defines a first annular groove 226 and a second annular groove 228. When valve member 192 is in the lower position, as shown in FIG. 13b, first annular groove 226 provides communication between regulator port 136 and lower bag port 134 so that regulated air is provided to lower bag 34 to lower lift axle 26. Second annular groove 228 provides communication between exhaust port 128 and lift bag port 132 so that air exhausts from lift bag 32.

When valve member 192 is in the lift position, as shown in FIG. 14, second annular groove 228 provides communication between compressor port 126 and lift bag port 132 so that pressurized air is provided to lift bag 32 to raise lift axle 26. First annular passage 226 provides communication between exhaust port 128 and lower bag port 134 so that air exhausts from lower bag 40.

As shown in FIG. 13b, control valve 120 further includes a piston or diaphragm 230 coupled to valve member 192. Diaphragm 230 is positioned within an enlarged diaphragm-receiving portion 232 of sleeve 210 and seals against inner surface 214. Inner surface 214 includes a first end 235 and a second end 236 that defines control port 152. Thus, when pressurized air is provided to control port 152 by first pilot valve 122, as previously described, the pressurized air acts upon diaphragm 230 and pushes valve member 192 to the lift position as shown in FIG. 14.

Diaphragm-receiving portion 232 includes a pressure-relief passage 233, as shown in FIG. 13b, that vents air from behind diaphragm 230 as it moves valve member 192 to the lift position. Pressure-relief passage 233 also permits air to re-enter the area behind diaphragm 230 when valve member 192 moves back to the lower position.

As shown in FIG. 13b, control valve 120 further includes a spring 238 positioned to bias valve member 192 to the lower position. Valve member 192 includes a spring pocket 240 that cooperates with first end 235 of inner surface 214 of sleeve 210 to define a spring chamber 234 in which spring 238 is positioned. When valve member 192 moves to the lift position, spring 238 is compressed as shown in FIG. 14. Valve member 192 includes a pressure-relief passage 242 that permits air in spring chamber 234 to exhaust when valve member 192 moves to the lift position. When pressurized air is not provided to diaphragm 230, spring 238 urges valve member 192 back to the lower position. Pressure-relief passage 242 also permits air to re-enter spring chamber 234 when valve member 192 moves to the lower position.

According to alternative embodiments of the present disclosure, other configurations of control valves are provided. For example, according to one alternative embodiment of the present disclosure, the control valve has its own housing that is coupled to an outer surface of the main housing. According to another alternative embodiments of the present disclosure, other suitable valve configurations known to those of ordinary skill in the art are provided.

Figure 9:
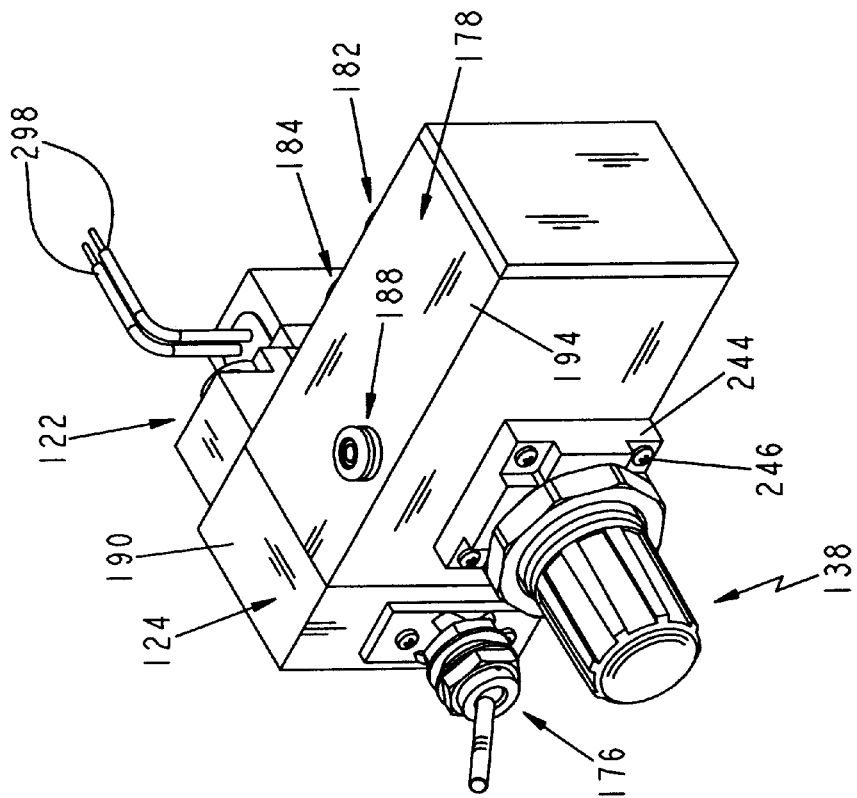
FIG. 9 is a perspective view of the lift axle control system of FIG. 8.

As shown in FIG. 16, air pressure regulator 138 includes a housing 244. coupled to outer surface 194 of housing 178 by a plurality of fasteners or screws 246 shown in FIG. 9. Air pressure regulator 138 further includes a regulator mechanism 248 configured to control the pressure level of air provided to regulator passage 142 from compressor passage 140 and a pressure adjustment mechanism 250 configured to permit adjustment of the pressure level of the air provided. Regulator mechanism 248 includes a bolt 252 threaded into a bore 254 formed in housing 178.

Regulator mechanism 248 further includes a valve member 256 that slides on bolt 254 and seats on a valve seat 258 formed in housing 178. When valve member 256 is in an open position, a gap exists between valve member 256 and valve seat 258 so that reassured air flows from compressor passage 140 to regulator passage 142. When valve member 256 is in a closed position, valve member 256 contacts valve seat 258 so that no air flows to regulator passage 142 as shown in FIG. 16.

Regulator mechanism 248 further includes a diaphragm 260 that responds to differences in pressure between regulator passage 142 and the atmosphere. Diaphragm 260 is coupled to a stem 257 of valve member 256 and sandwiched between housing 244 of air pressure regulator 138 and housing 178. If the air pressure on a passage side 262 of diaphragm 260 is greater than the air pressure on an atmosphere side 264 of diaphragm 260, diaphragm 260 is urged in direction 266 and pulls valve member 256 against valve seat 258 to block further flow of air from compressor passage 140 to regulator passage 142. If the air pressure on passage side 262 of diaphragm 260 is less than the air pressure on atmosphere side 264 of diaphragm 260, diaphragm 260 is urged in direction 268 and pushes valve member 256 away from valve seat 258 to permit pressurized air to flow from compressor passage 140 to regulator passage 142.

Adjustment mechanism 250 is configured to permit adjustment of the magnitude of pressure difference between passage and atmosphere sides 262, 264 required before diaphragm 260 will pull valve member 256 against valve seat 258. Adjustment mechanism 250 includes an adjustment knob 270 rotatably coupled to housing 246, a stud 272 configured to rotate with adjustment knob 270, a spring 274 positioned to bias diaphragm 260 in direction 268, and a hex nut 276 positioned between stud 272 and spring 274. The bias supplied by spring 274 acts with the atmospheric pressure on atmosphere side 264 of diaphragm 260 to urge diaphragm 260 in direction 268. Because of the extra force applied by spring 274 in direction 268, the air pressure on passage side 262 of diaphragm 260 must be even greater to move valve member 256 into contact with valve seat 258. Therefore, more pressure is supplied to regulator passage 142 from compressor passage 140 because of spring 274.

Adjustment knob 270 is turned in a first direction 278 to increase the air pressure provided to regulator passage 142 and turned in a second direction 280 to decrease the air pressure provided to regulator passage 142. When knob 270 is turned in first direction 278, hex nut 276 moves in direction 268 and compresses spring 274. Because spring 274 is compressed further, even more force is applied to diaphragm 260 in direction 268 so that even more pressure on passage side 262 of diaphragm 260 is required to move valve member 256 into contact with valve seat 258 and even more pressure is supplied to regulator passage 142. When knob 270 is turned in second direction 280, hex nut 276 moves in direction 266 to reduce the compression of spring 274. Because spring 272 is compressed less, less force is applied to diaphragm 260 in direction 268 so that less pressure on passage side 262 of diaphragm 260 is required to move valve member 256 into contract with valve seat 258 and less pressure is supplied to regulator passage 142.

Knob 270 includes a square bore 277 sized to receive a first square end 279 of stud 272 so that stud 272 rotates with knob 270. Housing 244 includes an inner surface 279 defining a hexagonal bore 281 sized to receive hex nut 276. Inner surface 279 permits hex nut 276 to slide in hexagonal bore 281 in directions 266, 268, but prevents hex nut 276 from rotating relative housing 244. Hex nut 276 includes a plurality of internal threads 283 sized to receive a second threaded end 285 of stud 272 so that hex nut 276 slides relative to housing 244 and adjusts the compression of spring 274 when knob 270 is turned as previously described.

According to the preferred embodiment of the present disclosure, air pressure regulator 138 is a Model AR2000 Pressure Regulator available from SMC Corporation of America, Indianapolis, Ind. According to alternative embodiments of the present disclosure, other configurations of air pressure regulators known to those of ordinary skill in the art are provided. According to other alternative embodiments of the present disclosure, the air pressure regulator, if any, is spaced apart from the housing of the axle control system.

As shown in FIG. 16, gauge passage 141 formed in housing 178 is in communication with regulator passage 142. Gauge passage 141 communicates the pressure in regulator passage 142 to exterior gauge port 188. An air line (not shown) communicates this pressure to gauge 139 that is normally positioned in cab 22 so that the driver or other operator can monitor the pressure supplied to lower bag 40.

According to the preferred embodiment of the present disclosure, gauge 139 is a Model K50 Pressure Gauge available from SMC Corporation of America, Indianapolis, Ind. According to alternative embodiments of the present disclosure, other configurations of pressure gauges known to those of ordinary skill in the art are provided. According to other alternative embodiments of the present disclosure, the gauge is positioned outside the cab. For example, according to one alternative embodiment, the gauge is coupled to the housing of the lift axle control system.

Figure 8:
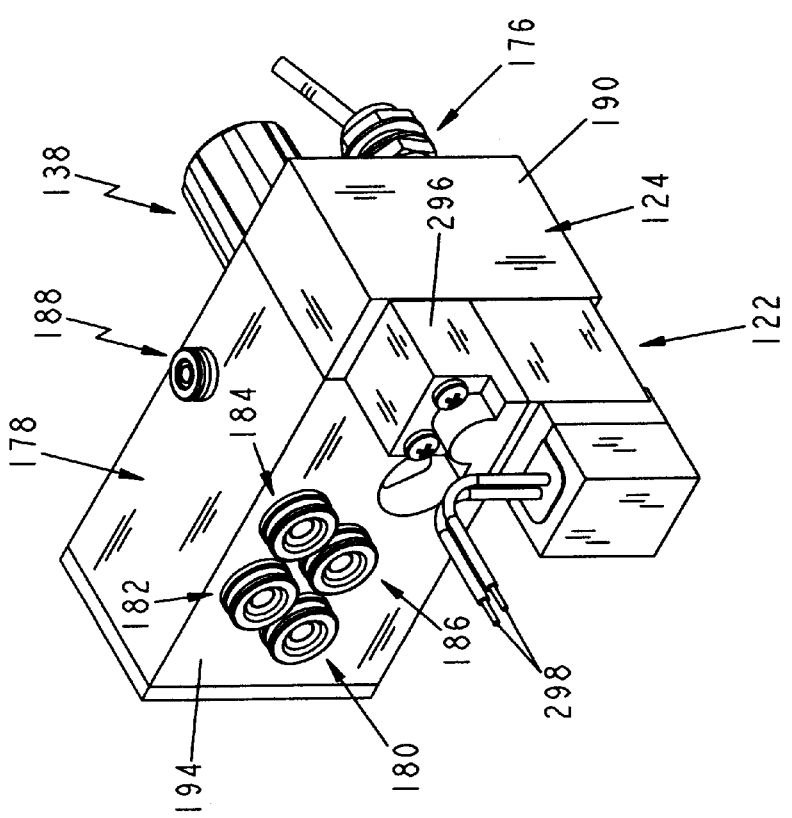
FIG. 8 is a perspective view of the preferred embodiment lift axle control system of FIG. 4.
Figure 10:
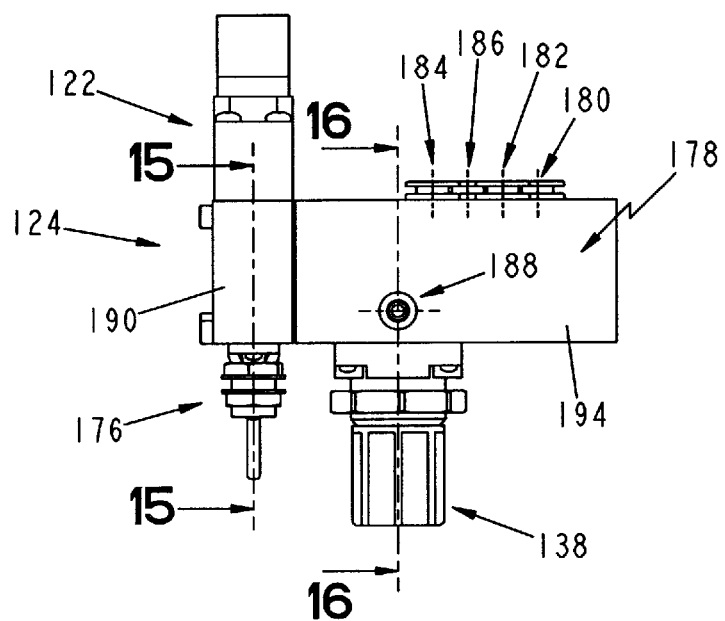
FIG. 10 is a top plan view of the lift axle control system of FIG. 8.
Figure 11:
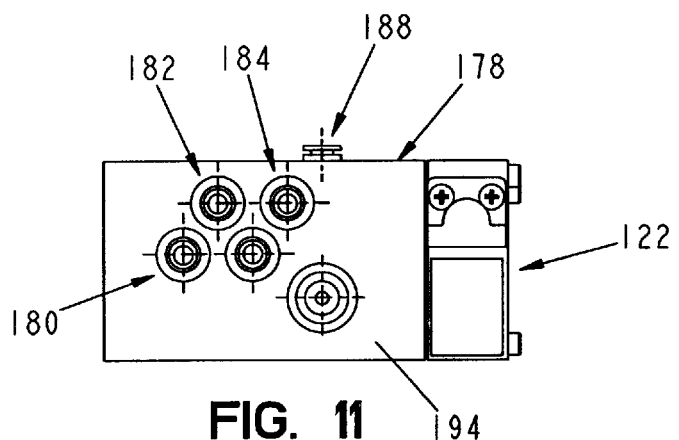
FIG. 11 is a side elevation view of the lift axle control system of FIG. 8.
Figure 12:
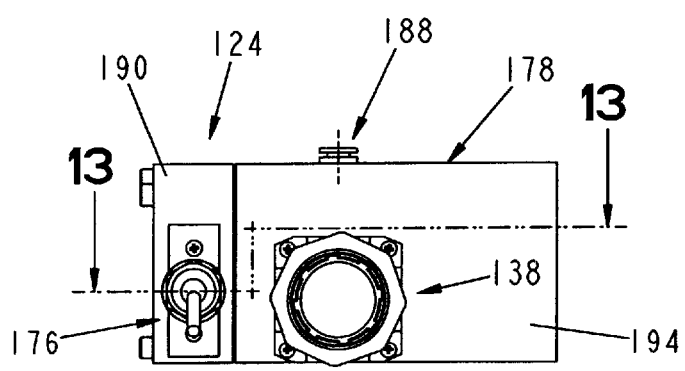
FIG. 12 is a side elevation view of the lift axle control system of FIG. 8.

As shown in FIG. 15, toggle switch 176 includes a base 282 coupled to an outer surface 284 of housing 190 of second pilot valve 124 by a plurality of fasteners or screws 288. Toggle switch 176 further includes a switch member 290 coupled to base 282 and configured to move between a lift position, as shown in FIGS. 8 and 9, and a lower position, as shown in FIG. 15. Switch member 290 is configured to move second pilot valve 124 between the first and second positions. Second pilot valve 124 includes a valve member 292 that slides in housing 190 between open and closed positions and a valve seat 294 coupled to housing 190. When valve member 292 is in the open position, a gap exists between valve member 292 and valve seat 294 so that pressurized air flows from compressor passage 163 to pilot valve passage 157. When valve member 292 is in a closed position, valve member 292 contacts valve seat 294 so that no pressurized air from compressor passage 163 flows to pilot valve passage 157. When first and second pilot valves 122, 124 are in the first position to lower lift axle 26, air vents from control port 152 through passage 166 of first pilot valve 122 to passage 157 and out of toggle switch 176 to the atmosphere.

According to the preferred embodiment of the present disclosure, toggle switch 176 and second pilot valve 124 are a combined Model VM130 Toggle Switch/Valve available from SMC Corporation of America, Indianapolis, Ind. According to alternative embodiments of the present disclosure, other toggle switches, other mechanical switches, electrical switches, or other configurations of switches known to those of ordinary skill in the art are provided. According to other alternative embodiments of the present disclosure, other configurations of pilot valves, if any, are provided such as other mechanically operated pilot valves, other pneumatic pilot valves, or other configurations of pilot valves known to those of ordinary skill in the art.

As shown in FIGS. 8 and 9, first pilot valve 122 includes a housing 296 and a pair of electric wires 298 coupled to housing 296 that extend to switch 174. Electrical wires 298 are also coupled to the solenoid positioned within housing 296. As previously mentioned, switch 174 moves between the activated state or position activating the solenoid of first pilot valve 122 and a de-activated state or position de-activating the solenoid. When the solenoid is activated by switch 174, first pilot valve 122 is moved to the second position to raise lift axle 26. When the solenoid is de-activated by switch 174, first pilot valve 122 is moved to the first position and lift axle 26 is lowered if second pilot valve 124 is also in the first position or remains in the raised position if second pilot valve 124 is in the second position.

According to the preferred embodiment of the present disclosure, first pilot valve 122 is a Model V0307 Pilot Valve available from SMC Corporation of America, Indianapolis, Ind. According to other alternative embodiments of the present disclosure, other configurations of pilot valves, if any, are provided such as other mechanically operated pilot valves, other pneumatic pilot valves, or other configurations of pilot valves known to those of ordinary skill in the art.

Figure 17:
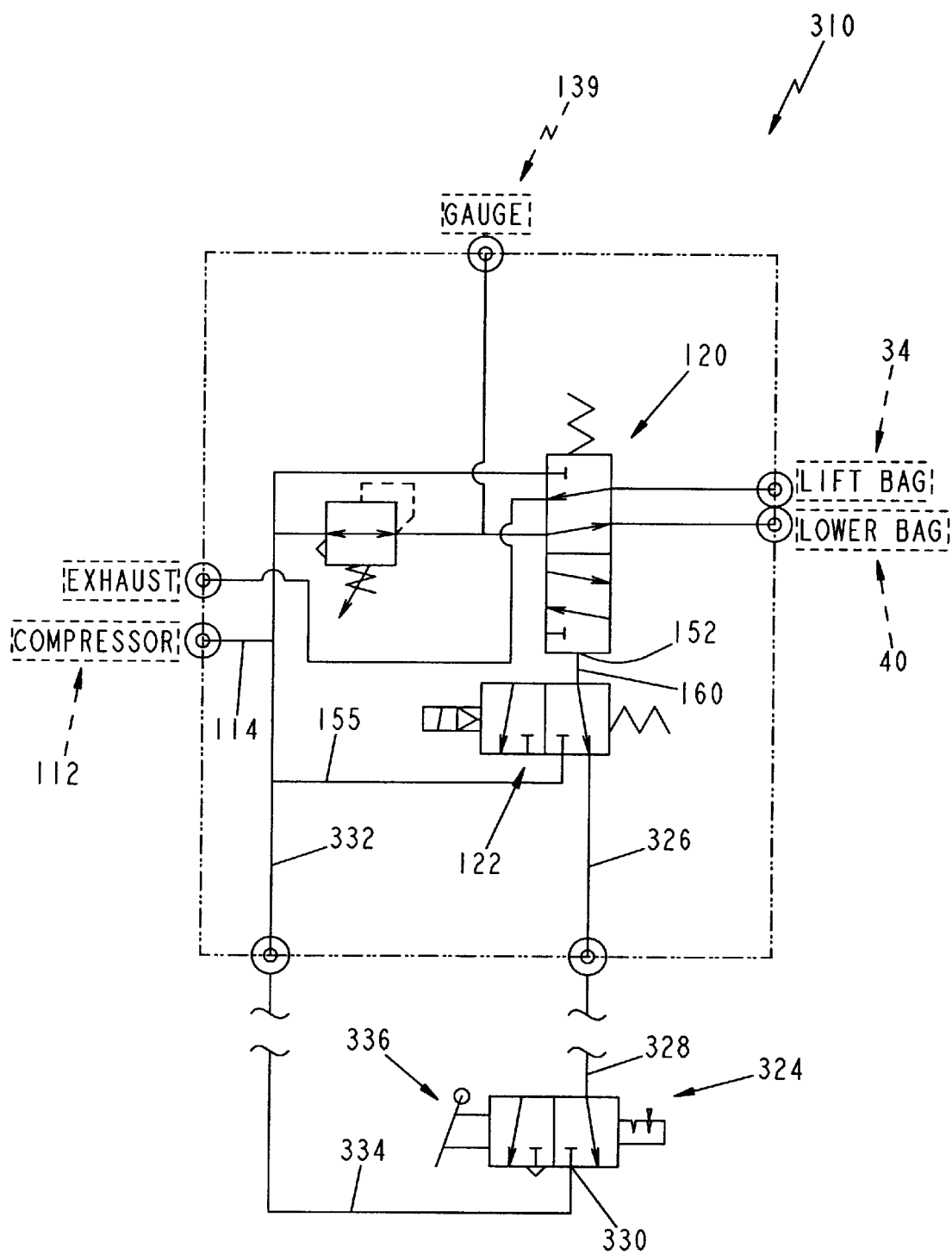
FIG. 17 is a diagrammatic view of an alternative embodiment lift axle control system including a control valve (shown in a vertical orientation), a first pilot valve (positioned below the control valve), and a remote second pilot valve (positioned below the first pilot valve) showing the first and second pilot valves in lower positions so that the control valve is also in a lower position providing air to the lower bag to lower the lift axle and exhausting the lift bag.

A diagram of an alternative embodiment lift axle control system 310 is provided in FIG. 17. Lift axle control system 310 is provided to control the inflation and deflation of lift and lower bags 34, 40. Lift axle control system 310 is similar to lift axle control system 110. Use of element numbers used to describe lift axle control system 110 indicates that the component is substantially identical to the component of lift axle control system 110.

As shown in FIG. 17, lift axle control system 310 includes a remote second pilot valve 324 that interacts with first pilot valve 122 in a manner substantially similar to second pilot valve 124. For example, second pilot valve 324 is movable between a first position, as shown in FIG. 17, and a second position (see for example second pilot valve 124 in FIGS. 5 and 7). When in the second position, second pilot valve 324 provides pressurized air from compressor 112 to control port 152 of control valve 120 to raise lift axle 26.

Second pilot valve 324 is preferably positioned in cab 22 so that the driver or other operator can activate raising and lowering of lift axle 26 from within cab 22. Therefore, in addition to controlling the raising of lift axle 26 from within cab 22 by placing vehicle 10 in reverse, the driver can also activate raising of lift axle 26 by moving second pilot valve 324 to the second position.

Second pilot valve 324 communicates with first pilot valve 122 through a first pilot valve passage 326 and a second pilot valve passage or air line 328. Second pilot valve 324 includes a compressor port 330 in communication with compressor 112 through a first compressor passage 332 and a second compressor passage or air line 334.

Lift axle control system 310 further includes a mechanical toggle switch 336 that controls movement of second pilot valve 324. Mechanical toggle switch 336 is substantially identical to mechanical toggle switch 176. Switch 336 moves between first and second positions to move second pilot valve 324 between the first and second positions to raise and lower lift axle 26 if first pilot valve 122 is in the first position.

Figure 19:
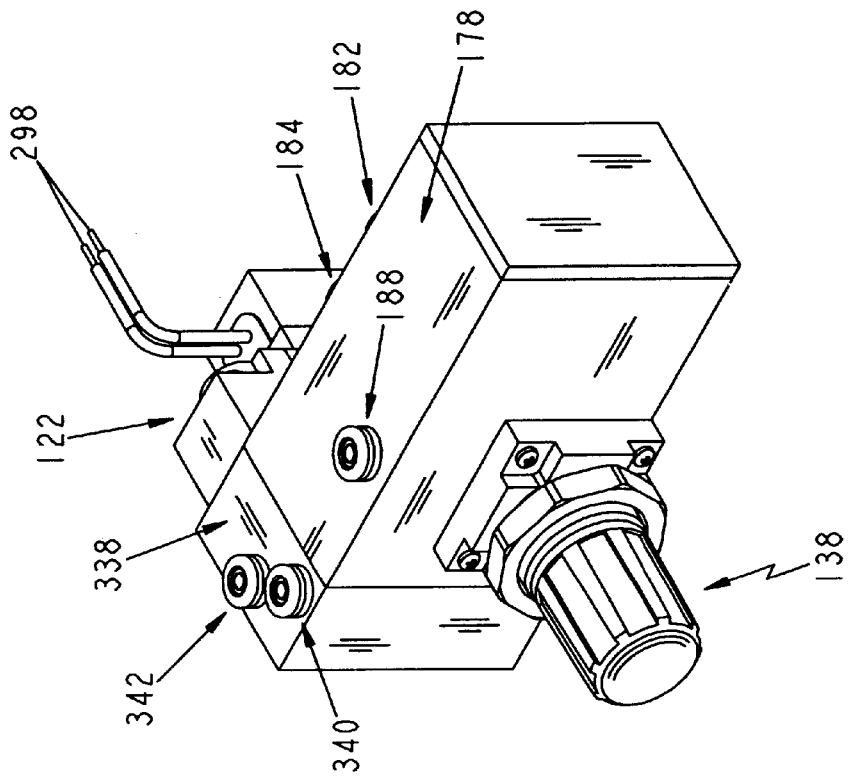
FIG. 19 is a perspective view of the lift axle control system of FIG. 17.
Figure 18:
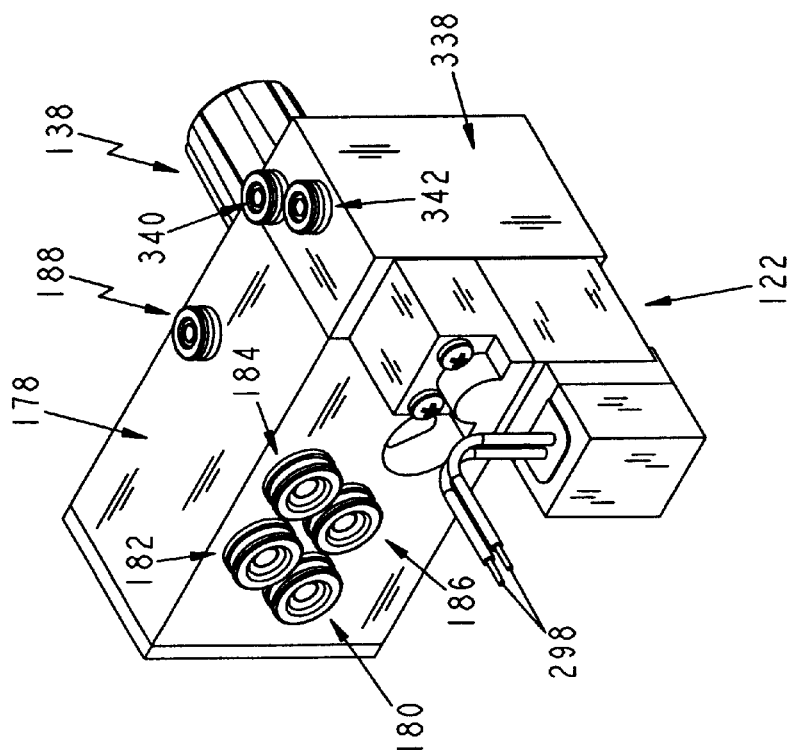
FIG. 18 is a perspective view of the alternative embodiment lift axle control system of FIG. 17.

As shown in FIGS. 18 and 19, lift axle control system 310 further includes primary housing 178 and secondary housing 338. Secondary housing 338 is directly coupled to housing 178. First pilot valve 122 is directly coupled to secondary housing 338 and indirectly coupled to housing 178 through secondary housing 338.

Secondary housing 338 includes several air passages or lines that communicate air to and from first and second pilot valves 122, 324. For example, secondary housing 338 includes a portion of compressor passage 114 that communicates with compressor 112, compressor passage 155 that communicates pressurized air from compressor passage 114 to first pilot valve 122, and compressor passage 332 that communicates pressurized air from compressor passage 114 to second pilot valve 324. Secondary housing 338 also includes control valve passage 160 that communicates air between control port 152 of control valve 120 and first pilot valve 122 and first pilot valve passage 326 communicating air between first and second pilot valves 122, 324.

As shown in FIGS. 18 and 19, a plurality of exterior ports are provided to communicate air to and from main and secondary housings 178, 338. For example, exterior compressor, lift and lower bag, exhaust, and gauge ports 180, 182, 184, 186, 188 are provided on main housing 178. An exterior compressor port 340 is provide to couple first compressor passage 332 to second compressor passage 334 SO that pressurized air is provided to second pilot valve 324. Similarly, an exterior pilot valve port 342 is provided to couple first pilot valve passage 326 to second pilot valve passage 328 to provide communication between first and second pilot valves 122, 324.

As previously mentioned, lift axle control system 310 is substantially similar to lift axle control system 110. However, second pilot valve 324 is remote from main housing 178. Second pilot valve 324 and associated toggle switch 336 are positioned in cab 22 so that an operator can raise and lower lift axle 26 without leaving cab 22. According to alternative embodiments of the present disclosure, the second pilot valve and/or toggle switch are positioned in remote locations other than cab 22. According to other alternative embodiments of the present disclosure, the remote switch (either mechanically, electrically, or otherwise controlled) operates an electrical second pilot valve, such as a solenoid pilot valve, that is either coupled to the main housing or remote from the main housing.

Figure 20:
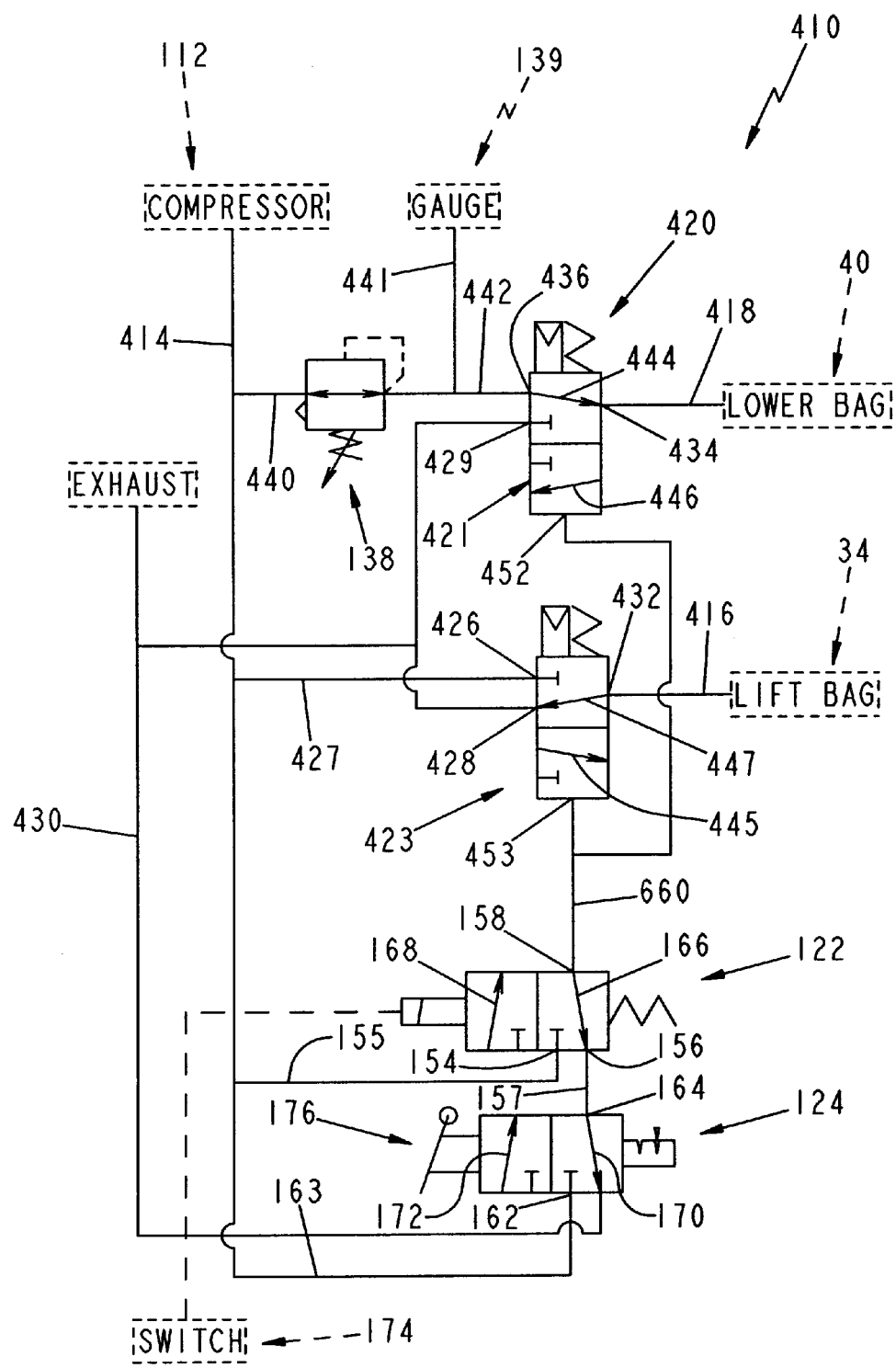

A diagram of another alternative embodiment lift axle control system 410 is provided in FIG. 20. Lift axle control system 410 is provided to control the inflation and deflation of lift and lower bags 34, 40. Lift axle control system 410 is similar to lift axle control system 110. Use of element numbers used to describe lift axle control system 410 indicates that the component is substantially identical to the component of lift axle control system 110.

Lift axle control system 410 includes a compressor passage 414 that communicates with air compressor 112. Lift axle control system 410 further includes lift and lower bag passages 416, 418 that communicate with lift and lower bags 34, 40 to control the flow of air from air compressor 112 to lift and lower bags 34, 40. Similarly, lift axle control system 410 controls the flow of air from lift and lower bags 34, 40 through lift and lower bag passages 416, 418 to deflate lift and lower bags 34, 40.

In a manner similar to lift axle control system 110, lift axle control system 410 is configured to automatically raise and lower lift axle 26 when vehicle 10 is placed into and taken out of reverse. Therefore, when vehicle 10 is placed in reverse, lift axle control system 410 automatically inflates lift bag 34 and exhausts lower bag 40 to raise lift axle 26 and avoid binding of lift axle 26. When vehicle 10 is taken out of reverse, lift axle control system 410 automatically inflates lower bag 40 and exhausts lift bag 34 to lower lift axle 26 and reduce the weight-per axle ratio.

Lift axle control system 410 includes a control valve 420 having a lower valve 421 and a lift valve 423, first or solenoid-operated pilot valve 122 coupled to lower and lift valves 421, 423 and compressor 112, and second or mechanically-operated pilot valve 124 coupled to first pilot valve 122 and compressor 112. Control valve 420 is configured to direct the flow of air to and from lift and lower bags 34, 40. Lower valve 421 moves between a lower position, as shown in FIG. 20, directing pressurized air to lower bag 40 and a lift position, as shown in FIG. 22, exhausting lower bag 40. Lift valve 423 moves between a lower position, as shown in FIG. 20, exhausting lift bag 34 and a lift position, as shown in FIG. 21, directing pressurized air to lift bag 34. According to alternative embodiments of the present disclosure, other configurations of control valves are provided that have fewer or more valves to control raising and lowering of the lift axle.

First and second pilot valves 122, 124 are operated as described above to control the position of lift and lower valves 421, 423. First pilot valve 122 is coupled to both lower and lift valves 421, 423 to coordinate their movement so that each valve 421, 423 is in the same position as the other valve 423, 421.

Lift valve 423 includes a compressor port 426 in communication with compressor passage 414 through another compressor passage 427, an exhaust port 428 in communication with an exhaust passage 430 that exhausts to the atmosphere, a lift bag port 432 in communication with lift bag passage 416. Lower valve 421 includes a lower bag port 434 in communication with lower bag passage 418, an exhaust port 429 in communication with exhaust passage 430, and a regulator port 436. Lift axle control system 410 further includes air pressure regulator 138 configured to provide air to regulator port 436 at a predetermined pressure. Air pressure regulator 138 receives pressurized air from compressor 112 through a passage 440 and delivers regulated air to regulator port 436 through a regulator passage 442 as shown in FIG. 20.

Lift axle control system 410 further includes gauge 139 normally positioned in cab 22. Gauge 139 communicates with air pressure regulator 138 through a gauge passage 441. A driver monitors gauge 139 to determine if an appropriate amount of pressure is being provided to lower bag 40 by air pressure regulator 138.

Lower valve 421 further includes a plurality of flow passages that align with selected ports 429, 434, 436 when lower valve 421 is in either the lift or lower positions. For example, lower valve 421 includes a first inflate passage 444 that aligns with regulator port 436 and lower bag port 434 when lower valve 421 is in the lower position and a second exhaust passage 446 that aligns with exhaust port 429 and lower bag port 434 when control valve 420 is in the lift position. Similarly, lift valve 423 includes a first inflate passage 445 that aligns with compressor port 426 and lift bag port 432 when lift valve 423 is in the lift position and a second exhaust passage 447 that aligns with exhaust port 428 and lift bag port 432 when lift valve 423 is in the lower position.

When lower and lift valves 421, 423 are in the lower position, regulated air from air pressure regulator 138 is delivered to lower bag 40 through first inflate passage 444 of lower valve 421 and air exhausts from lift bag 34 to the atmosphere through second exhaust passage 447, as shown in FIG. 20, to lower lift axle 26. Similarly, when lower and lift valves 421, 423 are in the lift position, pressurized air from air compressor 112 is delivered to lift bag 34 through first inflate passage 445 of lift valve 423 and air exhausts from lower bag 40 to the atmosphere through second exhaust passage 446 of lower valve 421 as shown in FIGS. 21–23.

Each lower and lift valve 421, 423 further includes a control port 452, 453 configured to receive pressurized air. When pressurized air is applied to control ports 452, 453, lower and lift valves 421, 423 move to the lift position as shown in FIGS. 21–23. When pressurized air is no longer provided to control ports 452, 453, lower and lift valves 421, 423 move to the lower position as shown in FIG. 20.

First and second pilot valves 122, 124 are configured to control the application of pressurized air to control ports 452, 453 to control the position of lower and lift valves 421, 423 as previously described. First pilot valve 122 includes compressor port 154 in communication with compressor 112 through compressor line 155, second pilot valve port 156 in communication with second pilot valve 124 through pilot valve passage 157, and control valve port 158 in communication with control ports 452, 453 of lower and lift valves 421, 423 through a control passage or line 660. Second pilot valve 124 includes compressor port 162 in communication with compressor 112 through compressor line 163 and first pilot valve port 164 in communication with first pilot valve 122 through pilot valve passage 157. First and second pilot valves 122, 124 are operated as described earlier for lift axle control system 110.

As shown in FIG. 20, when first and second pilot valves 122, 124 are both in the first position, first passage 166 of first pilot valve 122 aligns with control valve port 158 and second pilot valve port 156 and first passage 170 of second pilot valve 124 aligns with first pilot valve port 164 so that no pressure is applied to control ports 452, 453 of lower and lift valves 421, 423. Thus, lower and lift valves 421, 423 move to the lower position to lower lift axle 26. Furthermore, any pressure that may have existed at control ports 452, 453 is vented through first passages 166, 170 of first and second pilot valves 122, 124.

When either of first or second pilot valves 122, 124 is in the second position, pressure from compressor 112 is applied to control port 452, 453 of lower and lift valves 421, 423 as shown in FIGS. 21–23. Thus, lower and lift valves 421, 423 move to the raised position to raise lift axle 26. Lift axle control system 410 further includes electrical and mechanical toggle switches 174, 176 that control movement of first and second pilot valves 122, 124 as previously described.

As shown in FIGS. 24 and 25, lift axle control system 410 further includes a housing 478 similar to housing 178. Lift and lower valves 421, 423, air pressure regulator 138, and second pilot valve 124 are directly coupled to housing 478. First pilot valve 122 and toggle switch 176 are directly coupled to second pilot valve 124 and indirectly coupled to housing 178 through second pilot valve 124.

A plurality of exterior ports are provided to communicate air to and from housing 478. For example, exterior compressor port 180 is provided that couples to an air supply line (not shown) extending to compressor 112. Exterior lift and lower bag ports 182, 184 are provided that couple to air lines (not shown) extending to lift and lower bags 34, 40. Exterior exhaust port 186 is provided that vents to the atmosphere and an exterior gauge port 188 is provided that couples to an air line (not shown) extending to gauge 139.

Housing 478 includes a plurality of interior passages (not shown) similar to those of housing 178 that provide communication between exterior compressor, lift and lower bag, exhaust, and gauge ports 180, 182, 184, 186, 188 and compressor, exhaust, lift bag, lower bag, exhaust, and regulator ports 426, 428, 432, 434, 429, 436.

Lift and lower valves 421, 423 each include housings 479 and valve members (not shown) and sleeves (not shown)

similar to valve member 192 and sleeve 210. Housings 479 include an outer surface 495 and inner surfaces (not shown) defining interior regions in which the valve members are positioned. The sleeves are positioned between valve members and housing 479 to indirectly couple the valve members to housing 478 through the sleeves and housing 479. When pressurized air is provided to control ports 452, 453, the valve members move to a lift position. When pressurized air is no longer provided to control ports 452, 453, the valve members move back to the lower position.

According to the preferred embodiment of the present disclosure, lift and lower valves 421, 423 are Model VPA 544 Air Piloted Valve available from SMC Corporation of America, Indianapolis, Ind. According to one alternative embodiment of the present disclosure, the lift and lower valves are positioned in an interior region of the main housing. According to other alternative embodiments of the present disclosure, other configurations of valves known to those of ordinary skill in the art are provided.

Although the invention has been described with reference to preferred embodiments, variations and modifications exist within the scope and spirit of the invention as described and defined in the following claims.

What is claimed is:

1. A lift axle control system for a vehicle having a forward condition providing forward movement of the vehicle and a reverse condition providing reverse movement of the vehicle, the vehicle including a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid, the lift axle control system comprising, a housing including an inner surface defining a fluid passage, a port coupled to the housing and adapted to provide fluid communication between the fluid passage and the lift axle mover, a control valve configured to move between a lift position permitting the lift axle mover to move the wheels of the lift axle to the lifted position and a lower position controlling the flow of fluid between the source of pressurized fluid and the lift axle mover to move the wheels of the lift axle to the lowered position, a switch configured to move between a lift position controlling movement of the control valve to the lift position and a lower position controlling movement of the control valve to the lower position, the switch being configured to automatically move to the lift position when the vehicle is in the reverse condition, the switch being configured to automatically move to the lower position when the vehicle is out of the reverse condition, and a pilot valve supported by the housing and configured to control the movement of the control valve between the lift and lower positions.

2. The lift axle control system of claim 1, wherein the switch is electrical.

3. The lift axle control system of claim 1, wherein the pilot valve is mounted directly to the housing.

4. The lift axle control system of claim 1, wherein the pilot valve is electrically operated, the switch is electrically coupled to the pilot valve to control the pilot valve.

5. The lift axle control system of claim 1, further comprising a second switch configured to move between a lift position controlling movement of the control valve to the lift position and a lower position controlling movement of the control valve to the lower position and a second pilot valve supported by the housing and configured to control the movement of the control valve between the lift and lower positions.

6. The lift axle control system of claim 5, wherein one of the switches is coupled to the housing and the other of the switches is remote from the housing.

7. The lift axle control system of claim 5, wherein the switches are remote from the housing.

8. The lift axle control system of claim 5, wherein one of the switches is a manual toggle switch.

9. The lift axle control system of claim 1, further comprising another pilot valve configured to move the control valve between the lift and lower positions.

10. The lift axle control system of claim 9, wherein both pilot valves are supported by the housing.

11. The lift axle control system of claim 1, wherein the housing includes an interior region and the control valve is positioned in the interior region of the housing.

12. The lift axle control system of claim 1, wherein the control valve is configured to permit the flow of fluid from the source of pressurized fluid to the lift axle mover when in the lift position to move the wheels of the lift axle to the lifted position and the control valve is configured to permit fluid to exhaust from the lift axle mover when in the lift position to permit the wheels of the lift axle to move to the lifted position.

13. The lift axle control system of claim 12, wherein the control valve is configured to permit fluid to exhaust from the lift axle mover when in the lower position to permit movement of the wheels of the lift axle to the lowered position.

14. The lift axle control system of claim 1, further comprising a plurality of ports mounted on an outer surface of the housing, wherein the plurality of ports are in fluid communication with a plurality of fluid passages formed in the housing, the pilot valve is in fluid communication with at least one of the fluid passages, the control valve is positioned in an interior region of the housing, and the pilot valve is spaced apart from the interior region of the housing.

15. A lift axle control system for a vehicle having a forward condition providing forward movement of the vehicle and a reverse condition providing reverse movement of the vehicle, the vehicle including a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid, the lift axle control system comprising, a housing, a control valve including a valve member positioned in a valve member-receiving passage defined by an inner surface of the housing, the valve member being configured to slide relative to the inner surface of the housing between a lift position permitting the lift axle mover to move the wheels of the lift axle to the lifted position and a lower position controlling the flow of fluid between the source of pressurized fluid and the lift axle mover to move the wheels of the lift axle to the lowered position, and a pressure regulator mounted to the housing to control the pressure level of the fluid provided to the lift axle mover from the source of pressurized fluid.

16. The lift axle control system of claim 15, wherein the housing further includes an outer surface and the pressure regulator is mounted to the outer surface.

17. The lift axle control system of claim 15, wherein the pressure regulator is positioned in an interior region of the housing.

18. The lift axle control system of claim 15, further comprising a pilot valve mounted to an outer surface of the housing and configured to control movement of the valve member.

19. The lift axle control system of claim 15, further comprising a gauge configured to indicate the pressure level of the fluid provided to the lift axle mover from the source of pressurized fluid.

20. The lift axle control system of claim 19, wherein the gauge is remote from the housing.

21. The lift axle control system of claim 15, wherein the pressure regulator extends into the housing, the valve member includes a plurality of inner surfaces defining a plurality of fluid passages in fluid communication with the valve member-receiving passage, and at least one of the fluid passages is in fluid communication with the pressure regulator.

22. A lift axle control system for a vehicle having a forward condition providing forward movement of the vehicle and a reverse condition providing reverse movement of the vehicle, the vehicle including a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid, the lift axle control system comprising,
a housing,
a valve member positioned in an interior region of the housing, the interior region being sized to permit movement of the valve member between a lift position controlling the flow of fluid from the source of pressurized fluid to the lift axle mover to move the wheels of the lift axle to the lifted position and a lower position controlling the flow of fluid from the source of pressurized fluid to the lift axle mover to move the wheels of the lift axle to the lowered position, and
a first pilot valve directly coupled to the housing, the first pilot valve being configured to control movement of the valve member between the lift and lower positions.

23. The lift axle control system of claim 22, wherein the housing further includes an outer surface and the first pilot valve is mounted to the outer surface.

24. The lift axle control system of claim 22, further comprising a second pilot valve configured to control movement of the valve member between the lift and lower positions.

25. The lift axle control system of claim 24, wherein the first pilot valve is positioned between the second pilot valve and the housing.

26. The lift axle control system of claim 24, wherein the second pilot valve moves between a lift position moving the valve member to the lift position and a lower position moving the valve member to the lower position, and the second pilot valve automatically moves to the lift position upon movement of the vehicle to the reverse condition.

27. The lift axle control system of claim 26, wherein the second pilot valve automatically moves to the lower position upon movement of the vehicle out of the reverse condition.

28. The lift axle control system of claim 22, wherein the first pilot valve is mounted to an outer surface of the housing, and the housing includes a plurality of ports adapted to provide fluid communication between the interior region of the housing and the lift axle mover.

29. A lift axle control system configured to control raising and lower of a lift axle of a vehicle, the vehicle including a lift bag positioned to lift the lift axle, a lower bag configured to lower the lift axle, and a source of pressurized fluid, the lift axle control system comprising
a housing including a lift bag port in fluid communication with the lift bag, a lower bag port in fluid communication with the lower bag, a source port in fluid communication with the source of pressurized fluid, and a plurality of inner surfaces defining a plurality of fluid passages in fluid communication with the lift bag port, lower bag port, and source port,
a control valve coupled to the housing and configured to control the flow of fluid from the source of pressurized fluid to the lift and lower bags of the vehicle, the valve being configured to move to a lift position providing fluid from the source of pressurized fluid to the lift bag and exhausting the lower bag when the vehicle is placed in reverse, the valve being configured to move to a lower position providing fluid from the source of pressurized fluid to the lower bag and exhausting the lift bag when the vehicle is taken out of reverse, and
a pressure regulator extending into the housing.

30. The lift axle control system of claim 29, wherein the control valve is configured to provide fluid to the lower bag that has passed through the pressure regulator.

31. The lift axle control system of claim 30, wherein the control valve is configured to provide fluid to the lift bag without passing through the pressure regulator.

32. The lift axle control system of claim 29, further comprising a first pilot valve configured to control movement of the control valve and a switch coupled to the first pilot valve, wherein the first pilot valve is movable between a lift position moving the control valve to the lift position and a lower position moving the control valve to the lower position and the switch causes automatic movement of the first pilot valve to the lift position when the vehicle is placed in a reverse condition.

33. The lift axle control system of claim 32, further comprising a second pilot valve configured to control movement of the control valve, wherein the second pilot valve is movable between a lift position moving the control valve to the lift position and a lower position moving the control valve to the lower position.

34. The lift axle control system of claim 33, wherein the control valve is moved to the lift position when either of the first and second pilot valves is moved to the lift position.

35. The lift axle control system of claim 33, wherein the control valve is moved to the lower position only when the first pilot valve is in the lower position and the second pilot valve is in the lower position.

36. The lift axle control system of claim 33, wherein the second pilot valve is coupled to the housing, the first pilot valve is coupled to the second pilot valve, the second pilot valve is manually-operable, and the first pilot valve is electrical.

37. The lift axle control system of claim 29, wherein the pressure regulator includes a valve member positioned in an interior region of the housing and in fluid communication with at least one of the fluid passages and an adjustment knob positioned externally of the housing.

38. A lift axle control system for a vehicle having a forward condition providing forward movement of the vehicle and a reverse condition providing reverse movement of the vehicle, the vehicle including a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid, the lift axle control system comprising, a housing including a plurality of inner surfaces defining a plurality of fluid passages, a valve member positioned in the housing, the valve member being configured to move between a lift position permitting the lift axle mover to move the wheels of the lift axle to the lifted position and a lower position controlling The flow of fluid between the source of pressurized fluid and the lift axle mover to move the wheels of the lift axle to the lowered position, and a switch positioned on the housing and configured to move between a lift position and a lower position.

39. The lift axle control system of claim 38, further comprising a pilot valve supported by the housing and configured to control movement of the valve member.

40. The lift axle control system of claim 39, wherein the switch is coupled to the pilot valve.

41. The lift axle control system of claim 39, wherein the pilot valve is mounted to an outer surface of the housing.

42. The lift axle control system of claim 38, wherein the switch is a toggle switch.

43. The lift axle control system of claim 38, wherein the housing includes an inner surface defining an interior region sized to receive the valve member and permit sliding valve member between the lift and lower positions.

44. The lift axle control system of claim 43, the fluid passages are in fluid communication with the interior region.

45. A lift axle control system for a vehicle having a forward condition providing forward movement of the vehicle and a reverse condition providing reverse movement of the vehicle, the vehicle including a chassis, a plurality of fixed axles supporting the chassis and having wheels normally in contact with the ground, a lift axle having wheels movable between a lifted position and a lowered position supporting the chassis, a lift axle mover configured to move the wheels of the lift axle between the lifted and lowered positions, and a source of pressurized fluid, the lift axle control system comprising, a housing, a valve member positioned in an interior region of the housing and configured to move between a lift position permitting the lift axle mover to move the wheels of the lift axle to the lifted position and a lower position controlling the flow of fluid between the source of pressurized fluid and the lift axle mover to move the wheels of the lift axle to the lowered position, and a pilot valve mounted on an outer surface of the housing and configured to control movement of the valve member between the lift and lower positions.

46. The lift axle control system of claim 45, wherein the housing includes a plurality of inner surfaces defining fluid passages and the pilot valve is in fluid communication with at least one of the fluid passages.

47. The lift axle control system of claim 46, wherein pressurized fluid flows through at least one of the fluid passages to the pilot valve and through another of the fluid passages from the pilot valve to the valve member.

48. The lift axle control system of claim 46, further comprising an adjustable pressure regulator mounted to an outer surface of the housing, wherein the pressure regulator extends into the housing and provides pressurized fluid to at least one of the fluid passages of the housing.

* * * * *